(12) United States Patent
Zeger et al.

(10) Patent No.: US 9,544,126 B2
(45) Date of Patent: Jan. 10, 2017

(54) JOINT USE OF MULTI-PACKET RECEPTION AND NETWORK CODING FOR PERFORMANCE IMPROVEMENT

(71) Applicant: Massachusetts Institute of Technology, Cambridge, MA (US)

(72) Inventors: Linda M. Zeger, Lexington, MA (US); Jason M. Cloud, Cambridge, MA (US); Muriel Medard, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 766 days.

(21) Appl. No.: 13/654,953

(22) Filed: Oct. 18, 2012

(65) Prior Publication Data

US 2015/0358973 A1 Dec. 10, 2015

Related U.S. Application Data

(60) Provisional application No. 61/553,386, filed on Oct. 31, 2011.

(51) Int. Cl.
| | |
|---|---|
| *H04W 4/00* | (2009.01) |
| *H04H 20/71* | (2008.01) |
| *H04J 1/10* | (2006.01) |
| *H04B 3/36* | (2006.01) |
| *H04L 5/16* | (2006.01) |

(Continued)

(52) U.S. Cl.
CPC .............. *H04L 5/16* (2013.01); *H04B 7/155* (2013.01); *H04L 1/0057* (2013.01); *H04L 1/0075* (2013.01); *H04L 1/0076* (2013.01); *H04W 28/08* (2013.01); *H04W 72/0466* (2013.01); *H04W 72/0493* (2013.01); *H04W 72/10* (2013.01); *H04W 72/1263* (2013.01); *H04L 63/0428* (2013.01); *H04L 63/12* (2013.01)

(58) Field of Classification Search
CPC ........ H04L 5/16; H04L 1/0057; H04L 1/0075; H04L 1/1887; H04B 7/155; H04B 7/2606; H04W 80/04
See application file for complete search history.

(56) References Cited

U.S. PATENT DOCUMENTS

| | | |
|---|---|---|
| 5,577,056 A | 11/1996 | Malik et al. |
| 6,128,773 A | 10/2000 | Snider |

(Continued)

FOREIGN PATENT DOCUMENTS

| | | |
|---|---|---|
| EP | 1 638 239 A1 | 3/2006 |
| WO | WO 2007/109216 A1 | 9/2007 |

(Continued)

OTHER PUBLICATIONS

U.S. Appl. No. 13/654,953, filed Oct. 18, 2012, Zeger, et al.

(Continued)

*Primary Examiner* — Kiet Tang
(74) *Attorney, Agent, or Firm* — Daly, Crowley, Mofford & Durkee, LLP

(57) ABSTRACT

Network coding and multiple packet reception (MPR) are used together in a wireless network. In at least one implementation, a novel medium access control (MAC) protocol is provided that enhances throughput in a wireless mesh network that uses network coding and MPR by providing fairness to information flows, rather than fairness to individual nodes.

36 Claims, 5 Drawing Sheets

(51) Int. Cl.

| | |
|---|---|
| *H04W 72/04* | (2009.01) |
| *H04W 72/10* | (2009.01) |
| *H04B 7/155* | (2006.01) |
| *H04W 28/08* | (2009.01) |
| *H04L 1/00* | (2006.01) |
| *H04W 72/12* | (2009.01) |
| *H04L 29/06* | (2006.01) |

(56) References Cited

U.S. PATENT DOCUMENTS

| | | |
|---|---|---|
| 6,621,851 B1 | 9/2003 | Agee et al. |
| 6,885,653 B2 | 4/2005 | Choi et al. |
| 7,064,489 B2 | 6/2006 | Price |
| 7,071,853 B2 | 7/2006 | Price |
| 7,095,343 B2 | 8/2006 | Xie et al. |
| 7,164,691 B2 | 1/2007 | Knapp et al. |
| 7,283,564 B2 | 10/2007 | Knapp et al. |
| 7,349,440 B1 | 3/2008 | Chou et al. |
| 7,408,938 B1 | 8/2008 | Chou et al. |
| 7,414,978 B2 | 8/2008 | Lun et al. |
| 7,529,198 B2 | 5/2009 | Jain et al. |
| 7,706,365 B2 | 4/2010 | Effros et al. |
| 7,760,728 B2 | 7/2010 | Chou et al. |
| 7,821,980 B2 | 10/2010 | Chakrabarti et al. |
| 7,876,677 B2 | 1/2011 | Cheshire |
| 7,912,003 B2 | 3/2011 | Radunovic et al. |
| 7,945,842 B2 | 5/2011 | He |
| 8,040,836 B2 | 10/2011 | Wu et al. |
| 8,068,426 B2 | 11/2011 | Sundararajan et al. |
| 8,130,776 B1 | 3/2012 | Sundararajan et al. |
| 8,279,781 B2 | 10/2012 | Lucani et al. |
| 8,451,756 B2 | 5/2013 | Lucani et al. |
| 8,482,441 B2 | 7/2013 | Medard et al. |
| 8,504,504 B2 | 8/2013 | Liu |
| 8,571,214 B2 | 10/2013 | Lima et al. |
| 9,143,274 B2 | 9/2015 | Zeger et al. |
| 2003/0055614 A1 | 3/2003 | Pelikan |
| 2003/0214951 A1 | 11/2003 | Joshi et al. |
| 2004/0203752 A1 | 10/2004 | Wojaczynski et al. |
| 2005/0010675 A1 | 1/2005 | Jaggi et al. |
| 2005/0078653 A1 | 4/2005 | Agashe et al. |
| 2005/0152391 A1 | 7/2005 | Effros et al. |
| 2005/0251721 A1 | 11/2005 | Ramesh et al. |
| 2006/0020560 A1 | 1/2006 | Rodriguez et al. |
| 2006/0146791 A1 | 7/2006 | Deb et al. |
| 2006/0224760 A1 | 10/2006 | Yu et al. |
| 2007/0046686 A1 | 3/2007 | Keller |
| 2007/0116027 A1 | 5/2007 | Ciavaglia et al. |
| 2007/0121618 A1 | 5/2007 | Hirano |
| 2007/0274324 A1 | 11/2007 | Wu et al. |
| 2008/0043676 A1 | 2/2008 | Mousseau et al. |
| 2008/0049746 A1 | 2/2008 | Morrill et al. |
| 2008/0123579 A1 | 5/2008 | Kozat et al. |
| 2008/0212524 A1* | 9/2008 | Niwano .............. 370/329 |
| 2008/0259796 A1 | 10/2008 | Abousleman et al. |
| 2008/0291834 A1 | 11/2008 | Chou et al. |
| 2008/0320363 A1 | 12/2008 | He |
| 2009/0003216 A1 | 1/2009 | Radunovic et al. |
| 2009/0073915 A1* | 3/2009 | Zhang et al. .......... 370/315 |
| 2009/0086706 A1 | 4/2009 | Huang et al. |
| 2009/0135717 A1 | 5/2009 | Kamal et al. |
| 2009/0153576 A1 | 6/2009 | Keller |
| 2009/0175320 A1 | 7/2009 | Haustein et al. |
| 2009/0198829 A1 | 8/2009 | Sengupta et al. |
| 2009/0207930 A1 | 8/2009 | Sirkeci et al. |
| 2009/0238097 A1 | 9/2009 | Le Bars et al. |
| 2009/0248898 A1 | 10/2009 | Gkantsidis et al. |
| 2009/0285148 A1 | 11/2009 | Luo et al. |
| 2009/0310582 A1 | 12/2009 | Beser |
| 2009/0313459 A1 | 12/2009 | Horvath |
| 2009/0316763 A1 | 12/2009 | Erkip et al. |
| 2010/0014669 A1 | 1/2010 | Jiang |
| 2010/0027563 A1 | 2/2010 | Padhye et al. |
| 2010/0046371 A1 | 2/2010 | Sundararajan et al. |
| 2010/0111165 A1 | 5/2010 | Kim et al. |
| 2010/0146357 A1 | 6/2010 | Larsson |
| 2011/0205961 A1* | 8/2011 | Santivanez et al. .......... 370/328 |
| 2011/0238855 A1 | 9/2011 | Korsunsky et al. |
| 2012/0057636 A1 | 3/2012 | Tian et al. |
| 2012/0149296 A1* | 6/2012 | Sawai .............. 455/7 |
| 2012/0155511 A1* | 6/2012 | Shaffer et al. .......... 375/133 |
| 2012/0218891 A1 | 8/2012 | Sundararajan et al. |
| 2012/0300692 A1 | 11/2012 | Sfar et al. |
| 2013/0077555 A1* | 3/2013 | Gao ............ H04L 1/1887 370/312 |
| 2013/0107764 A1 | 5/2013 | Zeger et al. |
| 2013/0114481 A1 | 5/2013 | Kim et al. |
| 2013/0114611 A1 | 5/2013 | Zeger et al. |
| 2013/0195106 A1 | 8/2013 | Calmon et al. |
| 2014/0064296 A1 | 3/2014 | Haeupler et al. |
| 2014/0185803 A1 | 7/2014 | Lima et al. |
| 2014/0268398 A1 | 9/2014 | Medard et al. |
| 2014/0269485 A1 | 9/2014 | Medard et al. |
| 2014/0269503 A1 | 9/2014 | Medard et al. |
| 2014/0269505 A1 | 9/2014 | Medard et al. |
| 2014/0280395 A1 | 9/2014 | Medard et al. |
| 2014/0280454 A1 | 9/2014 | Medard et al. |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2010/025362 A2 | 3/2010 |
| WO | WO 2010/026362 A2 | 3/2010 |
| WO | WO 2010/026362 A3 | 3/2010 |
| WO | WO 2011/043754 A1 | 4/2011 |
| WO | WO 2011/119909 A1 | 9/2011 |
| WO | WO 2012/167034 A2 | 12/2012 |
| WO | WO 2013/006697 A2 | 1/2013 |
| WO | WO 2013/067488 A1 | 5/2013 |
| WO | WO 2013/116456 A1 | 8/2013 |
| WO | WO 2014/159670 A1 | 10/2014 |
| WO | WO 2014/160194 A3 | 10/2014 |

OTHER PUBLICATIONS

U.S. Appl. No. 13/655,034, filed Oct. 18, 2012, Medard, et al.
U.S. Appl. No. 13/890,604, filed May 9, 2013, Zeger, et al.
U.S. Appl. No. 14/208,683, filed Mar. 13, 2014, Calmon, et al.
"Data Service Options for Spread Spectrum Systems: Radio Link Protocol Type;" 3GPP2 C.S0017-010-A; Version 2.0; Sep. 2005.
"Guest Editorial Wireless Video Transmission;" IEEE Journal on Selected Areas in Communications; vol. 28; No. 3; Apr. 2010; pp. 297-298.
Abichar, et al.; "WiMax vs. LTE: Who Will Lead the Broadband Mobile Internet?;" Mobile Computing; IEEE Computer Society; IT Pro May/Jun. 2010; pp. 26-32.
AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.
Acedanski, et al.; "How Good is Random Linear Coding Based Distributed Network Storage?;" Proc. $1^{st}$ Workshop on Network Coding, Theory, and Applications (Netcod'05); Apr. 2005; 6 pages.
Adamson, et al.; "Multicast Negative-Acknowledgment (NACK) Building Blocks;" Internet Engineering Task Force (IETF),RFC; vol. 5401; Nov. 2008; 42 pages.
Adamson, et al.; "NACK-Oriented (NORM) Transport Protocol;" Internet Engineering Task Force (IETF); RFC; vol. 5740; Nov. 2009; 94 pages.
Adamson, et al.; "Quantitative Prediction of NACK-Oriented Reliable Multicast (NORM) Feedback;" Proceedings, MILCOM 2000; vol. 2; Oct. 2002; 6 pages.
Ahlswede, et al.; "Network Information Flow;" IEEE Transactions of Information Theory; vol. 46; No. 4; Jul. 2000; pp. 1204-1216.
Ahmed, et al.; "On the Scaling Law of Network Coding Gains in Wireless Networks;" IEEE; MILCOM 2007; Oct. 2007; 7 pages.
Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.

(56) References Cited

OTHER PUBLICATIONS

Armstrong, et al,: "Distributed Storage with Communcation Costs;" IEEE Forty-Ninth Annual Allerton Conference—Allerton House; Sep. 28-30, 2011; pp. 1358-1365.

Awerbuch, at al.; "On-Line Generalized Steiner Problem;" Proceedings of the $7^{th}$ Annual ACM-SIAM Symposium on Discrete Algorithms; pp. 1-12; 1996.

Baek, et al.; "The International Journal of Computer and Telecommunications Networking;" vol. 56; Issue 6; Apr. 2012; pp. 1745-1762.

Baron, et al.; "Coding Schemes for Muitislot Messages in Multichannel ALOHA With Deadlines;" IEEE Transactions on Wireless Communications; vol. 1; No. 2; Apr. 2002; pp. 292-301.

Bellare, et al.; "A Concrete Security Treatment of Symmetric Encryption: Analysis of the DES Modes of Operation;" Proc. $38^{th}$ Annual Symposium on Foundations of Computer Science; Oct. 1997; pp. 1-32.

Berman, et al.; "Improved Approximations for the Steiner Tree Problem:" Journal of Algorithms; Chapter 39; pp. 325-334.

Bhadra, et al.; "Looking at Large Networks: Coding vs. Queuing;" Proc. Of the $25^{th}$ IEEE International Conference on Computer Communications (INFOCOM); Apr. 2006; 12 pages.

Bharath-Kumar, et al.; "Routing to Multiple Destinations in Computer Networks;" IEEE Transactions on Communications; vol. Com-31; No. 3; Mar. 1983; pp. 343-351.

Bhargava, et al.; "Forward Error Correction Coding;" Mobile Communications Handbook; Part 1: Basic Principals; 1999; 18 pages.

Birk, et al.; "Judicious Use of Redundant Transmissions in Multichannel ALOHA Networks with Deadlines;" IEEE Journal on Selected Areas In Communications; vol. 17; No. 2; Feb. 1999; pp. 257-269.

Bisson, et al.; "Reducing Hybrid Disk Write Latency with Flash-Backed I/O Requests;" Proceedings of the Fifteenth IEEE International Symposium on Modeling, Analysis, and Simulation of Computer Telecommunications Systems (MASCOTS'07); Oct. 2007; pp. 402-409.

Bonnin, et al.; "Automatic Multi-Interface Management Through Profile Handling;" Springer; Mobile Networks and Applications; Feb. 2009; pp. 4-17.

Borokhovich, et al.; "Tight bounds for Algebraic Gossip on Graphs;" Proc. of the IEEE International Symposium on Information Theory (ISIT); Jun. 13-18, 2010; 14 pages.

Borst, et al.; "Distributed Caching Algorithms for Content Distribution Networks"; IEEE INFOCOM; 2010 Proceedings IEEE; Mar. 14-19, 2010; 9 pages.

Borst, et al.; "Distributed Caching Algorithms for Content Distribution Networks;" Power Point Presentation; BCAM Seminar; Bilbao, Sep. 30, 2010; 36 pages.

Bui, et al.; "A Markovian Approach to Multipath Data Transfer in Overlay Networks;" IEEE Transactions on Parallel and Distributed Systems; vol. 21; No. 10; Oct. 2010; pp. 1398-1411.

Cai, et al.; "Secure Network Coding;" IEEE; ISIT; Jun. 30-Jul. 5, 202; p. 323.

Calmon, et al.; "Network Coding Over Multiple Network Interfaces Using TCP;" Presentation; Information Theory and Applications Workshop (ITA) 2012; San Diego, CA; Feb. 5, 2012; 55 pages.

Cardinal, et al.; "Minimum Entropy Combinatorial Optimization Problems;" Data Structure and Algorithms, Discrete Mathematics; Aug. 17, 2010; pp. 1-16.

Castro, et al.; "Upper and Lower Error Bounds for Active Leerning;" The 44'th Annual Allerton Conference on Communication, Control and Computing; vol. 2 No. 2.1; 2006, 10 pages.

Celik, et al.; "MAC for Networks with Multipacket Reception Capability and Spatially Distributed Nodes;" Proc. IEEE INFOCOM 2008; Apr. 2008; 9 pages.

Celik; "Distributed MAC Protocol for Networks with Multipacket Reception Capability and Spatially Distributed Nodes;" Master's Thesis; MIT Department of Electrical Engineering and Computer Science; May 2007; 127 pages.

Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.

Chakrabarti, et al.; "Approximation Algorithms for the Unsplittable Flow Problem;" Proceedings of the $5^{th}$ International Workshop on Approximation Algorithms for Combinatoriai Optimization; Sep. 2005, pp. 1-27.

Chakrabarti et al.; Approximation Algorithms for the Unsplittable Flow Problem; Algorithmica (2007); Springer Science—Business Media, Aug. 2006; 16 pages.

Charikar, et al.; "Approximation Algorithms for Directed Steiner Problems;" Proceedings of the $9^{th}$ ACM-SIAM Symposium on Discrete Algorithms, pp. 1-15; 1998.

Chen, et al.; "Pipeline Network Coding for Multicast Streams;" ICMU Org.; 2010; 7 pages.

Chou, et al.; "FEC and Pseudo-ARQ for Receiver-driven Layered Multicast of Audio and Video;" Data Compression Conference (DCC), 2000; Proceedings; Jan. 2000; 10 pages.

Chou, et al.; "Practical Network Coding;" Proceecilngs of the $41^{st}$ Annual Allerton Conference on Communication, Control, and Computing; Oct. 2003; 10 pages.

Cisco Visual Networking Index: Forecast and Methodology; 2009-2014; White Paper; Jun. 2, 2010; pp. 1-17.

Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.

Cloud, et al.; "Effects of MAC approaches on non-monotonic saturation with COPE—a simple case study;" Military Communication Conference, 2011—MILCOM; Aug. 11, 2011; 7 pages.

Cloud, et al.; "MAC Centered Cooperation—Synergistic Design of Network Codng, Multi-Packet Reception, and Improved Fairness to Increase Network Throughput;" IEEE Journal on Selected Areas in Communications; vol. 30; No. 2; Feb. 2012; pp. 1-8.

Cloud, et al.; "Multi-Path TCP with Network Coding;" Wireless@mit—MIT Center for Wireless Networks and Mobile Computing; 2012 Inaugural Retreat; Oct. 10-11, 2012.

Cloud, et al; U.S. Appl. No. 13/654,953, filed Oct. 18, 2012.

Costa, et al.; "Informed Network Coding for Minimum Decoding Delay;" Fifth IEEE International Conference on Mobile Ad-hoc and Sensor Systems; Sep. 2008; pp. 80-91.

Coughlin, et al.; Years of Destiny: HDD Capital Spending and Technology Developments from 2012-2016; IEEE Santa Clara Valley Magnetics Society; Jun. 19, 2012; pp. 1-28.

Dana, et al.; "Capacity of Wireless Erasure Networks;" IEEE Transactions on Information Theory; vol. 52; No. 3; Mar. 2006; pp. 780-804.

Dana et al.: "Capacity of Wireless Erasure Networks;" Jan. 2006; 41 pages.

Deb, et al.; "Algebraic Gossip: A Network Coding Approach to Optimal Multiple Rumor Mongering;" Proc. of the $42^{nd}$ Allerton Conference on Communication Control, and Computing; Jan 2004; 10 pages.

Deb, et al..; "On Random Network Coding Based Information Dissemination;" Proc. of the IEEE International Symposium on Information Theory (ISIT); Sep. 4-9, 2005; 5 pages.

Damers, et al.; "Epidemic Algorithms for Replicated Database Maintenance;" PODC '87 Proceedings of the sixth Annual ACM Symposium on Principles of distributed computing; Jan. 1987; pp. 1-12.

Dias, et al.; "Performance Analysis of HARQ in WiMax Networks Considering Imperfect Channel Estimation;" The $7^{th}$ International Teiecommunications Symposium (ITS 2010); 2010: 5 pages.

Dimakis, et al.; "A Survey on Network Codes for Distributed Storage;" Proceedirgs of the IEEE; vol. 99; No. 3; Mar. 2011; pp. 476-489.

Dimakis, et al.; "Network Coding for Distributed Storage Systems;" IEEE/ACM Transactions on Information Theory; vol. 56; No. 9; pp. 1-13.

Donoho, et al.; "Estimating Covariances of Locally Stationary Processes: Rates of Convergence of Best Basis Methods;" Statstics, Stanford University, Stanford, California, USA, Tech. Rep; 1998; pp. 1-64.

(56) References Cited

OTHER PUBLICATIONS

Effros; Distortion-Rate Bounds for Fixed-and Variable-Rate Multiresolution Source Codes; IEEE Transactions on Information Theory; vol. 45, No. 6; Sep. 1999; pp. 1887-1910.

Effros; "Universal Multiresolution Source Codes;" IEEE Transactions on Information Theory; vol. 47; No. 6; Sep. 2001; pp. 2113-2129.

El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421.

Eryilmaz, et al.; On Delay Performance Gains from Network Coding; Information Sciences and Systems; 2006 $40^{th}$ Annual Conference on Mar. 22-24, 2006; 7 pages.

Fan, et al.; "Reliable Relay Assisted Wireless Multicast Using Network Coding;" IEEE Journal on Selected Areas in communications; vol. 27; No. 5; Jun. 2009; pp. 749-762.

Feizi, et al.; "Locally Adaptive Sampling;" Communication, Control and Computing; 2010: $48^{th}$ Annual Allerton Conference, IEEE; Sep. 29, 2010; pp. 152-159.

Feizi, et al.; "On Network Functional Compression;" arXiv online repository; URL: http://arxiv.org/pdf/1011.5496v2.pdf; Nov. 30, 2010p pp. 1-60.

Feizi, et al.; "When Do Only Sources Need to Compute? On Functional Compression in Tree Networks;" $47^{th}$ Annual Allerton Conference, IEEE; Sep. 30, 2009; pp. 447-454.

Feizi, et al; "Cases Where Finding a Minimum Entropy Coloring of a Characteristic Graph is a Polynomial Time Problem;" IEEE International Symposium on Information Theory; Jun. 13, 2010; pp. 116-120.

Ferner, et al.; "Toward Sustainable Networking: Storage Area Networks with Network Coding:" Fiftieth Annual Allerton Conference; IEEE; Oct. 1-5, 2012; pp. 517-524.

Ford; "Architectural Guidelines for Multipath TCP Development;" Internet Engineering Task Force; Internet-Draft; Dec. 8, 2010; 17 pages.

Ford; "TCP Extension for Multipath Operation with Multiple Addresses draft-ford-mptcp-multiaddressed-03;" Internet Engineering Task Force; Internet-Draft; Mar. 8, 2010; 35 pages.

Fragouli, et al.; "Wireless Network Coding: Opportunities & Challenges," MILCOM; Oct. 2007; 8 pages.

Frossard, et al.; "Media Streaming With Network Diversity;" Invited Paper; Proceedings of the IEEE; vol. 96, No. 1; Jan. 2008; pp. 39-53.

Galbraith, et al.; (HGST); "Iterative Detection Read Channel Technology in Hard Disk Drives;" Whitepaper; Nov. 2008; 8 pages.

Garcia-Luna-Aceves; "Challenges: Towards Truly Scalable Ad Hoc Networks;" MobiCom 2007; Sep. 2007; pp. 207-214.

Garcia-Luria-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.

Ghaderi, et al.; Reliability Gain of Network Coding in Lossy Wireless Networks; Infocom 2008; The $27^{th}$ Conference on Computer Communications IEEE; Apr. 13-18, 2008; 5 pages.

Gheorghiu, et al.; "Multipath TCP with Network Coding for Wireless Mesh Networks;" IEEE Communications (ICC) 2010 International Conference; May 23-27, 2010; 5 pages.

Gheorghiu, et al.; "On the Performance of Network Coding in Multi-Resolution Wireless Video Streaming;" IEEE International Symposium on Jun. 9-11, 2010; 6 pages.

Ghez, at al.; "Stability Properties of Slotted Aloha with Multipecket Reception Capability;" IEEE Transactions on Automatic Control; vol. 33; No. 7; Jul. 1988; pp. 640-649.

Gkantsidis, et al.; "Cooperative Security for Network Coding File Distribution;" Proc. IEEE Infocom; Apr. 2006; 13 pages.

Gollakota, et al.; "ZigZag Decoding; Combating Hidden Terminals in Wireless Networks;" SIGCOMM 08; Aug. 17-22; pp. 159-170.

Golrezaei, et al.; "FemtoCaching: Wireless Video Content Delivery Through Distributed Caching Helpers;" arXiv:1109.417v2; Apr. 7, 2012; pp. 1-11.

Grant, et al.; "Graph Implementation for Nonsmooth Convex Programs;" LNCIS 371; Springer-Verlag Limited; Jan. 2008; pp. 95-110.

Gupta; "The Capacity of Wireless Networks;" IEEE Transactions on Information Theory; vol. 46; No. 2; Mar. 2000; pp. 388-404.

Hadzi-Veikov, et al.; "Capture Effect in IEEE 802.11 Basic Service Area Under Influence of Rayleigh Fading and Near/Far Effect;" IEEE; PIMRC 202; vol. 1; Sep. 2002; 5 pages.

Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.

Haeupier; "Analyzing Network Coding Gossip Made Easy;" Proc. of the $43^{rd}$ Symposium on Theory of Computing (STOC); Jan. 2011, 13 pages.

Haeupler, et al.; "Optimality of Network Coding in Packet Networks;" ArXiv, Feb. 17, 2011; 5 pages.

Haley, et. al.; "Reversible Low-Density Parity-Check Codes;" IEEE Transactions on Information Theory; vol. 55; No. 5; May 2009; pp. 2016-2036.

Halloush, et al.; "Network Coding with Multi-Generation Mixing: Analysis and Applications for Video Communication;" IEEE international Conference on Communications; May 19, 2008; pp. 198-202.

Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.

Han, et al.; "On Network Coding for Security;" IEEE Military Communications Conference; Oct. 2007; pp. 1-6.

Hassner, et al.; "4K Bye-Sector HDD-Data Format Standard;" Windows Hardware and Driver Central; San Jose, CA; Aug. 14, 2013; 5 pages.

Ho, et al.; "A Random Linear Network Coding Approach to Multicast;" IEEE Transaction on Information Theory; vol. 52; No. 10; Oct. 2006, pp. 4413-4430.

Ho, et al.; "Byzantine Modification Detection in Multicast Networks using Randomized Network Coding;" IEEE; ISIT; Jun. 27-Jul. 2, 2004; p. 144.

Ho, et al.; "Network Coding from a Network Flow Perspective;" ISIT; Jun.-Jul. 2003; 6 pages.

Ho, et al.; "On Randomized Network Coding;" Proceedings of $41^{st}$ Annual Allerton Conference on Communications, Control and Computing; Oct. 2003; 10 pages.

Ho, et al.; "On the utility of network coding in dynamic environments;" International Workshop on Wireless AD-HOC Networks (IWWAN); 2004; pp. 1-5.

Ho, et al.; "The Benefits of Coding over Routing in a Randomized Setting;" Proceedings of 2003 IEEE International Symposium on Information Theory; Jun. 2003; pp. 1-6.

Ho, et al.; "The Benefits of Coding over Routing in a Randomized Setting;" IEEE; ISIT Jun. 29-Jul. 4, 2003; p. 442.

Hofri; "Disk Scheduling: FCFS vs. SSTF Revisited;" Communicatims of the ACM; vol. 23; No, 11; Nov. 1980; pp. 645-653.

Hong, et al.; Network-coding-based hybrid ARQ scheme for mobile relay networks; Electronics Letters; vol. 46; No. 7; Apr. 1, 2010; 2 pages.

Internationai Disk Drive Equipment and Materials Assoc.; "Advanced Standard;" in Windows Hardware Engineering Conf.; May 2005; 11 pages.

Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.

Jacobson et al.; "Disk scheduling algorithms based on rotational position;" Hewlett-Packard laboratories; Palo Alto, CA; Technical Report HPL-CSP-91-7rev1; Feb. 26, 1991; 17 pages.

Jaggi, et al.; "Low Complexity Algebraic Multicast Network Codes;" Proceedings of the IEEE International Symposium on Information Theory; Jul. 4, 2003; 1 page.

(56) References Cited

OTHER PUBLICATIONS

Jaggi, et al.; "Resilient Network Coding in the Presence of Byzantine Adversaries;" Proc. IEEE INFOCOM; May 2007; 9 pages.
Jakubczak, et al.; "One-Size-Fits-All Wireless Video;" ACM SigComm Hotnets 2009; 6 pages.
Jamieson, et al.; "PPR: Portal Packet Recovery for Wireless Networks;" SIGCOMM 07; Aug. 27-31, 2007; 12 pages.
Jamieson, et al.; "PPR: Partial Packet Recovery for Wireless Networks;" Presentation; SIGCOMM 07; Aug. 27-31, 2007; 25 pages.
Jannaty, et al.; "Full Two-Dimensional Markov Chain Anaiysis of Thermal Soft Errors in Subthreshold Nanoscale CMOS Devices;" IEEE Transactions on Device and Materials Reliability; vol. 11; No. 1; Mar. 2011; pp. 50-59.
Ji, et. al; "A network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Random Network Coding Helpful in WiMax;" IEEE $27^{th}$ Conference on Computer Communications; Apr. 2008; 5 pages.
Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.
Karkpinski, et al.; "New Approximation Algorithms for the Steiner Tree Problems;" Technical Report, Electronic Colloquium on Computational Complexity (ECCC) TR95-030; 1995; pp. 1-17.
Karp, et al.; "Randomized Rumor Spreading;" IEEE Proceeding FOCS '00 Proceedings of the 41st Annual Symposium on Foundations of Computer Science: Jan. 2000; pp. 565-574.
Katti, et al.; "XORs in the Air: Practical Wireless Network Coding;" IEEE/ACM Transactions on Networking; vol. 16; No. 3; 2008; pp. 1-14.
Katti, et al.; "XORs in The Air: Practical Wireless Network Coding;" ACM SIGCOMM '06; Computer Communications Review; vol. 36; Sep. 11-15, 2008; 12 pages.
Kempe, et al.; "Protocols and Impossibility Results for Gossip-Based Communication Mechanisms;" Foundations of Computer Science, Jan. 2002; Proceedings. The $43^{rd}$ Annual IEEE Symposium; pp. 471-480.
Key, et al.; "Combining Multipath Routing and Congestion Control for Robustness;" In Proceedings of IEEE CISS, 2006, 6 pages.
Kim, et al.; "Modeling Network Coded TCP Throughout: A Simple Model and its Validation;" VALUETOOLS '11 Proceedings of the $5^{th}$ International ICST Conference on Performance Evaluation Methodologies and Tools; May 16-20, 2011; 10 pages.
Kim, et al.: "Modeling Network Coded TCP Throughput: A Simple Model and its Validation", Cornell University Library, http://arxiv.org/abs/1008.0420, Aug. 2010, 3 pages.
Kim, et al.; "Network Coding for Multi-Resolution Multicast;" IEEE INFOCOM 2010; Mar. 2010; 9 pages.
Kim, at al.; "Transform-free analysis of the GI/G/1/K queue through the decomposed Little's formula;" Computers and Operations Research; vol. 30; No. 3; Mar. 2003; pp. 1-20.
Kim, et. al.; "Modeling Network Coded TCP Throughput: A Simple Model and its Validation", arXiv: 1008.0420v1 [cs.IT] Aug. 2, 2010; 9 pages.
Kim, et. al.; "Modeling Network Coded TCP Throughput: A Simple Model and its Validation", Nov. 2010, Presentation; 19 pages.
Kodialam, et al.; "Online Muiticast Routing With Bandwidth Guarantees: A New Approach Using Multicast Network Flow;" IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11, No. 5; Oct. 2003; pp. 782-795.
Koetter, et al.; "Beyond Routing: An Algebraic Approach to Network Coding;" IEEE Infocom; 2002; 9 pages.
Koutsonikolas, et al.; "Efficient Online WiFI Delivery of Layered-Coding Media using Inter-layer Network Coding;"Distributed Computing Systems (ICDCS); 2011 $31^{st}$ International Conference on Jun. 2011; 11 pages.
Kritzner, at al.; "Priority Based Packet Scheduling with Tunable Reliability for Wireless Streaming;" Lecture Notes in Computer Science; 2004; pp. 707-717.
Kuhn, et al.; "Distributed Computation in Dynamic Networks;" Proc. of the $42^{nd}$ Symposium on Theory of Computing (STOC); Jun. 5-8, 2010; 10 pages.
Lai; "Sequential Analysis: Some Classical Problems and New Challenges"; Statistica Sinica, vol. 11, No. 2; 2001; pp. 303-350.
Landau; "Application of the Volterra Series to the Analysis and Design of an Angle Track Loop;" IEEE Transactions on Aerospace and Electronic Systems; vol. AES-8, No. 3; May 1972; pp. 306-318.
Larsson, et al.; "Analysis of Network Coded HARQ for Multiple Unicast Flows;" Communication (ICC) 2010 IEEE Internatimal Conference on May 23-27, 2010 pp. 1-6.
Larson, et al.; "Multi-User ARQ;" Vehicular Technology Conference; 2006; VTC (2006-Spring); IEEE $63^{rd}$; vol. 4; May 7-10, 2006; pp. 2052-2057.
Larsson; "Analysis of Muiti-User ARQ with Multiple Unicast Flows Under Non-iid Reception Probabilities;" Wireless Communication and Networking Conference 2007; WCNC 2007; IEEE; Mar. 11-15, 2007; pp. 384-388.
Larsson; "Multicast Multiuser ARQ;" Wireless Communications and Networking Conference (WCNC) 2008; IEEE; Apr. 3, 2008; pp. 1965-1090.
Le, et al.; "How Many Packets Can We Encode?—An Analysis of Practical Wireless Network Coding;" INFOCOM 2008; The $27^{th}$ Conference on Computer Communications, IEEE; 2008: pp. 1040-1048.
Lee, et al.; "Content Distribution in VANETs using Network Coding: The Effect of Disk I/O and Processing O/H;" Proc. IEEE SECON; Jan. 2008; pp. 117-125.
Lehman, et al; "Complexity Classification of Network Information Flow Problems;" SODA 04' Proceedings of the fifteenth annual ACM-SIAM symposium on Discrete algorthms; Jan. 2004; pp. 9-10.
Li et al.; "N-in-1 Retransmission with Network Coding;" IEEE Transactions on Wireless Communications; vol. 9; No. 9; Sep. 2010; pp. 2689-2894.
Li, et al.; "Robust and Flexibie Scalable Video Multicast with Network Coding over P2P Network," $2^{nd}$ International Congress on Image and Signal Processing, IEEE; Oct. 17, 2009; pp. 1-5.
Li,et al.; "Linear Network Coding;" IEEE Transactions on Information Theory; vol. 49; No. 2; Feb. 2003; pp. 371-381.
Lima, et al.; "An Information-Theoretic Cryptanalysis of Network Coding—is Protecting the Code Enough;" International Symposium on Information Theory and its Applications; Dec. 2008; 6 pages.
Lima, et al.; "Random Linear Network Coding: A free cipher?" IEEE International Symposium on Information Theory; Jun. 2007; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding," IEEE Information Theory Workshop; Jun. 12, 2009; pp. 125-129.
Liu, et al.; "The Throughput Order of Ad Hoc Networks Emoloying Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07; Proceedings of the 2007 Workshop on Peer-to-peer Streaming and IP-TV; Aug. 31, 2007 ACM; 6 pages.
Luby, et al.; "The Use of Forward Error Correction (FEC) in Reliable Multicast;" Internet Society Request for Comments; RFC 3453; Dec. 2002; 18 pages.
Lucani et al.; "On Coding for Delay New Approaches based on Network Coding in Network Coding in Networks with Large Latency;" Presentation in NetCod; Slide Presentation; Jun. 16, 2009; 17 pages.

(56) References Cited

OTHER PUBLICATIONS

Luciani et al; "Broadcsting in Time-Division Dupexing: A Random Linear Network Coding Approach;" presented Switzerland; Conference: NetCod 2009, Lausanne, Switzerland; Jun. 2009; 6 pages.

Lucani et al; "On Coding for Delay—New Approaches Based on Network Coding in Networks with Large Latency;" Conference: ITA Workshop, San Diego, USA; Feb. 2009; 10 pages.

Lucani et al; "On Coding for Delay New Approaches based on Network Coding in Networks with Large Latency;" Conference ITA Workshop, San Diego, USA; Slide Presentation; Feb. 13, 2009; 11 pages.

Lucani et al; "Random Linear Network Coding for Time Division Duplexing: Energy Analysis;" Conference: ICC 2009, Dresden, Germany; Jun. 2009; 5 pages.

Lucani et al; "Random Linear Network Coding for Time-Division Duplexing: when to stop taiking and start listening;" Presentation in ICC; Slide Presentaton; Jun. 16, 2009; 6 pages.

Lucani et al; "Random Linear Network Coding for Time-Division Duplexing: when to stop talking and start listening;" Presentation in INFOCOM; Slide Presentation; Apr. 23, 2009; 10 pages.

Lucani et al; "Random Linear Network Coding for Time-Division Duplexing: Queueing Analysis;" Conference ISIT 2009, Seoul, Korea; Jul. 2009; 5 pages.

Lucani et al; "Random Linear Network Coding for Time-Division Duplexing: Field Size Considerations;" Conference: GLOBECOM 2009, Hawaii, USA; Dec. 2009; 6 pages.

Lucani, et al.; "Network Coding for Data Disstamination: It is Not What You Know, but What Your Neighbors Don't Know;" Modeling and Optimization in Mobile AdHoc, and Wireless Networks 2009; WiOPT 2009; $7^{th}$ International Symposium on Jun. 23-27, 2009; pp. 1-8.

Lucian, et al.; "Network Coding Schemes for Underwater Networks;" WUWNet 07; Sep. 14, 2007; pp. 25-32.

Lucani, et al.; Systematic Network Coding for Time-Division Duplexing; Proceedings of the IEEE International Symposium on Information Theory (ISIT); ; Jun. 13-18, 2010; pp. 2403-2407.

Lun, et al.; "Further Results on Coding for Reliable Communication over Packet Networks;" Information Theory, ISIT 2005 Proceedings international Symposium on Sep. 4-9, 2005; 5 pages.

Lun et al.; "On Coding for Reliable Communication Over Packet Networks;" Physical Communication; vol. 1; No. 1; Jan. 2008, pp. 10 pages.

Lun, et al.; "On Coding for Reliable Communication over Packet Networks;" LIDS Publication #2741; Jan. 2007; 33 pages.

Lun, et al.; An Analysis of Finite-Memory Random Linear Coding on Packet Streams; Modeling and Optimization in Mobile, Ad Hoc and Wireless Networks; Apr. 3-6, 2008; pp. 1-6.

Lun; "Efficent Operation of Coded Packet Networks;" Ph.D. Dissertation: Massachusetts Institute of Technology; Jun. 2006; 130 pages.

Magli, et al.; "An Overview of Network Coding for Multimedia Streaming;" IEEE International Conference; Jun. 28, 2009; pp. 1488-1491.

Mallat, S. "Adaptive Covariance Estimation of Locally Stationary Processes;" Annals of Statistics, vol. 26, No. 1, 1998; pp. 1-43.

Manssour, et al.; "A Unicast Retransmission Scheme based on Network Coding;" IEEE Transactions on Vehicular Technology; vol. 61; Issue 2; Nov. 2011; 7 pages.

Maymounkov, et al.; "Methods for Efficient Network Coding;" Proc. of the $44^{th}$ Allerton Conference on Communication, Control, and Computing; Sep. 2006; 10 pages.

Médard, et al.; "On Coding for Non-Multicast Networks;" invited paper, $41^{st}$ Allerton Annual Conference on Communication, Control; Outgrowth of supervised student research Publications of Muriel Médard and Computing; vol. 1; Oct. 2003; 9 pages.

Medard; "Some New Directions for Network Coding in Content Distribution", RLE, EELS, MIT, Seminar to Alcatel Lucent, Nov. 2010, 29 pages.

Merchant, et al.; "Analytic Modeling of Clustered RAID with Mapping Based on Nearly Random Permutation;" IEEE Transactions on Computers; vol. 45; No. 3; Mar. 1996; pp. 367-373.

Metzner; "An Improved Broadcast Retransmission Protocol:" IEEE Transactions on Communications; vol. COM-32; No. 6; Jun. 1984; pp. 679-683.

Mosk-Aoyama, et al.; "Information Dissemination via Network Coding;" ISIT 2006; IEEE; Jul. 9-14, 2006; pp. 1748-1752.

Moyer, et al.; "A Survey of Security issues in Muiticast Communications;" IEEE Network; vol. 13; No. 6; Nov./Dec. 1999; pp. 12-23.

Nguyen, at al; "Internet Media Streaming Using Network Coding and Path Diversity;" IEEE Global Telecommunications Conference; Nov. 30-Dec. 4, 2008; 5 pages.

Nguyen, et al.; "Wireless Broadcast Using Network Coding;" Vehicular Technology IEEE Transactions on Feb. 2009; vol. 58; issue 2; 25 pages.

Nguyen, et al; "Video Streaming with Network Coding;" Journal of Signal Processing Systems; vol. 59, Issue 3; DOI: 10.1007/s11265-009-0342-7; Jun. 2010; 25 pages.

Nobel; "Hypothesis Testing for Families of Ergodic Processes;" Bernoulli-London, vol. 12, No. 2; 2006; 21 pages.

Noguichi, et al.; "Performance Evaluation of New Multicast Architecture with Network Coding;" IEICE Transactions on Communication; E86-B; No. 6; Jun. 2003; 3 pages.

NS Version 1—LBNL Network Simulator; web page—http://ee.lel.gov/ns/; Mar. 21, 2011; 3 pages.

Nyandoro, et al.; "Service Differentiation in Wireless LANs based on Capture;" IEEE GLOBECOM 2005; vol. 6; Dec. 2005; 5 pages.

Oliveira, et al.; "A Network Coding Approach to Secret Key Distribution;" IEEE Transactions on Information Forensics and Security; vol. 3; No. 3; pp. 414-423; Sep. 2008.

ParandehGheibi, et al.; "Access-Network Association Policies for Media Streaming in Heterogeneous Environments;" Apr. 2010; pp. 1-8.

Peng, et al.; "Research on Network Coding based Hybrid-ARQ Scheme for Wireless Networks;" Communication Systems (ICCS); 2010 IEEE International Conference on Nov. 17-19, 2010; pp. 218-222.

Popovici, et al.; "Robust, Portable I/O Scheduling with the Disk Mimic;" Proc. USENIX Annual Tech. Conf. San Antonio, Texas, Jun. 2003; 14 pages.

Qureshi, et al.; "An Efficient Network Coding based Retransmission Algorithm for Wireless Multicast;" Personal, Indoor and Mobile Radio Communications, 2009 IEEE $20^{th}$ International Symposium on Sep. 13-16, 2009; 5 pages.

Radunovic, et al.; "Horizon: Balancing TCP Over Multiple Paths in Wireless Mesh Network;" Proc. $14^{th}$ ACM International Conference on Mobile Computing and Networking; Sep. 2008; 12 pages.

Ramanathan; "Multicast Tree Generation in Networks with Asymmetric Links;" IEEE Transactions on Networking; vol. 4; Aug. 1996; pp. 1-12.

Rezaee, et al.; "Multi Packet Reception and Network Coding;" Presentation at The 2010 Military Communications Conference Unclassified Technical Program; Nov. 2, 2010; 15 pages.

Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.

Renee, et al., "Speedng Multicast by Acknowledgment Reduction Technique (SMART);" ArXiv:1104.2041v2 [cs.NI] Sep. 10, 2011; 6 pages.

Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.

Rezaee, et.al.; "Multi Packet Reception and Network Coding;" Military Communications Conference; 2010; MILCOM 2010; IEEE; Oct. 31, 2010-Nov. 3, 2010; pp. 1303-1398.

Rezaee; "Network Coding, Multi-Packet Reception, and Feedback: Design Tools for Wireless Broadcast Networks;" Submitted to

(56) References Cited

OTHER PUBLICATIONS

Department of Electrical Engineering and Computer Science at Massachusetts Institute of Technology; Sep. 2011; 92 pages.
Riemensberger, et al.; "Optimal Slotted Random Access in Coded Wireless Packet Networks;" WiOPt 10; Modeling and Optimization in Mobile, Ad Hoc, and Wireless Networks; Jul. 13, 2010; pp. 374-379.
Roughgarden, et al.; "How Bad is Selfish Routing?" Journal of the ACM; vol. 49, No. 2; Mar. 2002; pp. 236-259.
Ruemmler, et al.; "An introduction to disk drive modeling;" IEEE Computers; vol. 27; No. 3; Mar. 17-29, 1994; 17 pages.
Ryabko, et al.; "On Hypotheses Testing for Ergodic Processes;" Information Theory Workshop; ITW'08; IEEE; 2008; pp. 281-283.
Sanders, et al.; "Polynomial Time Algorithms for Network Infomation Flow;" $15^{th}$ ACM Symposium on Parallel Algorithms and Architectures; Jun. 2003; pp. 1-9.
Sayenko, et al.; "Performance Analysis of the IEEE 802.16 ARQ Mechanism;" MSWiM'07; Oct. 22-26, 2007; pp. 314-322.
Scharf; "MPTCP Application Interface Considerations draft-scharf-mptcp-ap-04;" Internet Engineering Task Force; Internet-Draft; Nov. 22, 2010; 26 pages.
Seferogiu et al.; "Opportunistic Network Coding for Video Streaming over Wireless;" Packet Video; Nov. 2007; 10 pages.
Sengupta, et al.; "An Analysis of Wireless Network Coding for Unicast Sessions: The Case for Coding-Aware Routing;" in INFOCOM 2007; $26^{th}$ IEEE International Conference on Computer Communications; Jun. 2007; 9 pages.
Servetto, et al.; "Constrained Random Walks on Random Graphs: Routing Algorithms for Large Scale Wireless Sensor Networks;"WSNA 02; Sep. 28, 2002; 10 pages.
Shenker, et al.; "Pricing in computer networks: reshaping the research agenda;" Telecommunications Policy; vol. 20, No. 3; Jan. 1996; pp. 183-201.
Sherali, et al.; "Recovery of primal solutions when using subgradient optimization methods to solve Lagrangian duals of linear programs;" Elsevier Operations Research Letters 19 (Jan. 1996); pp. 105-113.
Shields; "The Interactions Between Ergodic Theory and Information Theory;" IEEE Transactions on Information Theory, vol. 44, No. 6; Oct. 1998; pp. 2079-2093.
Shrader, et al.; "Systematic wireless network coding;" Military Conference, 2009; MILCOM 2009; IEEE; 7 pages.
Shradar, et al; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740.
Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; 10 pages.
Song, et al.; "Zero-Error Network Coding for Acyclic Networks;" IEEE Transactions on Information Theory; vol. 49, No. 12; Dec. 2003; pp. 3129-3139.
SongPu, et al.; Performance analysis of joint chase combining and network coding in wireless broadcast retransmission; Wireless Communication, Network and Mobile Computing 2008; WiCOM '08, $4^{th}$ International Conference on Oct. 12-14, 2008; pp. 1-4.
Soo Suh; "Send-On-Delta Sensor Data Transmission With a Linear Predictor;" Sensors; ISSN 1424-8220; vol. 7; No. 4; Apr. 26, 2007; pp. 537-547.
Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.
Sundaram, et al.; "Multirate Media Streaming Using Network Coding;" Proc. $43^{rd}$ Allerton Conference on Communication, Control, and Computing; Sep. 2005; 7 pages.
Sundararajan, et al.; "ARQ for Network Coding;" ISIT Proc. of the IEEE International Symposium on Information Theory (ISIT); Jul. 6-11, 2008; pp. 1651-1655.
Sundaranajan, et al.; "Network Coding Meets TCP: Theory and Implementation;" Proceedings of the IEEE; vol. 99, Issue 3; Mar. 2011; pp. 490-512.
Sundarersien, et al.: "Network coding meets TCP;" InfoCOM 2009; IEEE, Apr. 19-25, 2009; pp. 280-288.
Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.
Teerapittayanon, et al.; "Network Coding as a WiMAX Link Reliability Mechanism;" Multiple Access Communication; Lectures Notes in Computer Science; vol. 7642; pp. 1-12; 2012.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; $7^{th}$ International ITG Conference on Jan. 14-16, 2008; 6 pages.
Tosun, et al.; "Effident Muiti-Layer Coding and Encryption of MPEG Video Streams;" Proc. 2000 IEEE, International Conference on Multimedia and Expo; vol. 1; 2000; pp. 119-122.
Tosun, et al.; "Lightweight Security MechaniSMS for Wireless Video Transmission;" Proc. Intl. Conference on Information Technology, Coding and Computing; Apr. 2001; pp. 157-161.
Tran, et al.; "A Hybrid Network Coding Technique for Single-Hop Wireless Networks;" IEEE Journal on Selected Areas in Communications; vol. 27; No. 5; Jun. 2009; pp. 685-698.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.
Trung, et al.; "Quality Enhancement for Motion JPEG Using Temporal Redundancies;" IEEE Transactions on Circuits and System for Video Technology, vol. 18; No. 5; May 2008; pp. 609-619.
Tsatsanis, et al.; "Network Assisted Diversity for Random Access Wireless Data Networks;" Signals, Systems & amp; Computers; IEEE; vol. 1; Nov. 1-4, 1988; pp. 83-87.
Velancius, et al.; "Greening the Internet with Nano Data Centers;" Proc. $5^{th}$ International Conference on Emerging Networking Experiments and Technologies; CoNEXT 2009; ACM 2009; Dec. 1-4, 2009; pp. 37-48.
Vasudevan, et al.; "Algebraic Gossip on Arbitrary Networks;" arXiv:0901.1444; Jan. 2009; 5 pages.
Velambi, et al.; "Throughput and Latency in Finite-Buffer Line Networks;" IEEE Transactions on Information Theory; vol. 57; No. 6; Jun. 2011; pp. 3622-3843.
Vien, al.; "Network Coding-based Block ACK for Wireiess Relay Networks;" Proceedings of IEEE Vehicular Technology Conference (VTC2011-Spring); May 2011: 5 pages.
Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.
Vilela, et al.; "Lightweight Security for Network Coding;" IEEE International Conference on Communicaios; May 2008; 5 pages.
Wang, et al.; "Capacity-Delay Tradeoff for Information Dissemination Modalities in Wireless Networks;" in Information Theory; ISIT 2008; IEEE International Symposium; Jul. 2008; pp. 677-681.
Wang, et al.; "Embracing Interference in Ad Hoc Networks Using Joint Routing and Scheduling with Multiple Packet Reception;" in INFOCOM 2008; The $27^{th}$ Conference on Computer Communications; IEEE; Apr. 2008; pp. 1517-1525.
Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.
Widmer, et al.; "Network Coding for Efficient Communication in Extreme Networks;", Applications, Technologies, Architectures, and Protocols for Computer Communication; Aug. 2005; pp. 284-291.

(56) References Cited

OTHER PUBLICATIONS

Wieselthier, et al.; "Energy Efficient Broadcast and Multicast Trees in Wireless Networks;" Mobile Networks and Applications 7; Jan. 2002; pp. 481-492.

Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; pp. 176-191.

Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.

Wu, et al.; "A Trellis Connectivity Analysis of Random Linear Network Coding with Buffering;" Proc. of the International Symposium on Information Theory (ISIT); Jul. 9-14, 2006; pp. 768-772.

Yazdi, et al.; "Optimum Network Coding for Delay Sensitive Applications in WiMAX Unicast;" IEEE INFOCOM 2009; Apr. 19-25, 2009; pp. 1570-2580.

Yeung; "Multilevel Diversity Coding with Distortion;" IEEE Transactions on Information Theory; vol. 41, No. 2; Mar. 1995; pp. 412-422.

Yong, et al.; "XOR Retransmission in Muiticast Error Recovery;" Networks 2000; ICON; Proceedings IEEE International Conference on Sep. 5-8, 2000; pp. 336-340.

Yun, et al.; "High-Throughput Random Access Using Successive Interference Cancellation in a Tree Algorithm;" IEEE Transactions on Information Theory; vol. 53; No. 12; Dec. 2007; pp. 4628-4639.

Yun, et al.; Towards Zero Retransmission Overhead: A Symbol Level Network Coding Approach to Retransmission IEEE Transactions on Mobile Computing; vol. 10; No. 8; Aug. 2011: pp. 1083-1095.

Zeger; "Packet Erasure Coding with Random Access Reduce Losses of Delay Sensitive Multislot Messages;" IEEE; Paper ID #900482; Aug. 18, 2009; pp. 1-8.

Zhang, et al.; "Collision Resolution in Packet Radio Networks Using Rotational Invariance Techniques;" IEEE Transactions on Communication; vol. 50; No. 1; Jan. 2002; pp. 146-155.

Zhang, et al.; "Optimized Multipath Network Coding in Loss Wireless Nehvorks;" ICDCS '08 Proceedings of the 2008 The 28$^{th}$ International Conference on Distributing Computing Systems; Jan. 2008; 12 pages.

Zhang, et al.; Dual XOR In the AIR: A Network Coding; Based Retransmission Scheme for Wireless Broadcasting; Communicatons (ICC) 2011 IEEE International Conference on Jun. 5-9, 2011; pp. 1-6.

Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.

Zhao, et al.; "On analyzing and improving COPE performance;" Infomation Theory and Applications Workshop (ITA), Jan. 2010; pp. 1-6.

Zhu, et al.; "Muticast with Network Coding in Application-Layer Overlay Networks;" IEEE Journal on Selected Areas in Communcatons; vol. 22; No. 1; Jan. 2004; pp. 1-13.

Rezaee et al., "Multi Packet Reception and Network Coding," Research Laboratory of Electronics Massachusetts Institute of Technology, The 2010 Military Communications Conference—Unclassified Program-Networking Protocols and Performance Track; 978-4244-8180-4/10 (2010), pp. 1393-1398.

Office Action dated Jan. 5, 2015 for U.S. Appl. No. 13/654,866, filed Oct. 18, 2012 61 pages.

U.S. Appl. No. 14/297,090, filed Jun. 5, 2014, Kim, et al.

U.S. Appl. No. 14/678,359, filed Apr. 3, 2015, Zeger, et al.

U.S. Appl. No. 14/668,185, filed Mar. 25, 2015, Medard, et al.

Ahlswede, et al.; "Network Information Flow;" IEEE Transactions on Information Theory, vol. 46; No. 4; Jul. 2000; pp. 1204-1216.

Ahme, et al.; "On the Scaling Law of Network Coding Gains in Wireless Networks;" IEEE; MILCOM 2007; Oct. 2007; 7 pages.

Celik; "Distributed MAC Protocol for Networks with Muitipacket Reception Capability and Spatially Distributed Nodes;" Master's Thesis; MIT Department of Electrical Engineering and Computer Science; May 2007; 127 pages.

Celik, et al.; "MAC for Networks with Multipacket Reception Capability and Spatially Distributed Nodes:" Proc. IEEE INFOCOM 2008; Apr. 2008; 9 pages.

Cloud, et al.; "Co-Designing Multi-Packet Reception, Network Coding, and MAC Using a Simple Predictive Model;"arXiv:1101.5779v1 [cs.NI]; Submitted to W.Opt 2011;Jan. 30, 2011; pp. 1-8.

Cloud, et al.; "MAC Centered Cooperation—Synergistic Design of Network Coding, Multi-Packet Reception, and Improved Fairness to Increase Network Througput;" IEEE Journal on Selected Areas in Communications; vol. 30; No. 2; Feb. 2012; pp. 1-8.

Cloud, et al.; "Effects of MAC approaches on non-monotonic saturation with COPE—a simple case study;" Military Communication Conference, 2011—MILCOM; Nov. 7-10, 2001; pp. 747-753.

Garcia-Luna-Aceves; "Challenges: Towards Truly Scalabie Ad Hoc Networks;" MobiGam 2007; Sep. 2007; pp. 207-214.

Garcia-Luna-Aceves; "Extending the Capacity of Ad Hoc Networks Beyond Network Coding;" IWCMC 07; Proceedings of the 2007 International Conference on Wireless Communicatons and Mobile Computing; ACM; 2007; pp. 91-96.

Ghez, et al.; "Stabiiity Properties of Slotted Aloha with Multipacket Reception Capability;" IEEE Transactions on Automatic Control; vol. 33; No. 7; Jul. 1988; pp. 640-649.

Hadzi-Velkov, et al.; "Capture Effect in IEEE 802.11 Basic Service Area Under Influence of Rayleigh Fading and Near/Far Effect" IEEE, PIMRC 202; vol. 1; Sep. 2002; 5 pages.

Ho, et al.; "A Random Linear Network Coding Approach to Multicast;" IEEE Transactions on Information Theory; vol. 52; No. 10; Oct. 2006; pp. 4413-4430.

Le, et al.; "How Many Packets Can We Encode?—An Analysis of Practical Wireless Network Coding;" INFOCOM 2008; The 27$^{th}$ Conference on Computer Communications, IEEE; 2008; pp. 1040-1048.

Liu, et al.; "The Throughput Order of Ad Hoc Networks Employing Network Coding and Broadcasting;" Military Communcations Conference; MILCOM 2006; Oct. 2006; pp. 1-7.

Rezaee, et al.; "Multi Packet Reception and Network Coding;" Military Communicatima Conference; 2010; MILCOM 2010; IEEE; Oct. 31, 2010-Nov. 3, 2010; pp. 1393-1398.

Rezaee; "Network Coding, Multi-Packet Reception, and Feedback: Design Tools for Wireless Broadcast Networks;" Master's Thesis; MIT Department of Electrical Engineering and Computer Science; submitted Sep. 2011; 92 pages.

Rezaee, et al.; "Multi Racket Reception and Network Coding;" Presentation at The 2010 Military Communications Conference Unclassified Technical Program; Nov. 2, 2010; 15 pages.

Sengupta, et al.; "An Analysis of Wireless Network Coding for Unicast Sessions: The Case for Coding-Aware Routing;" in INFOCOM 2007; 26$^{th}$ IEEE International Conference on Computer Communications; Jun. 2007; pp. 1028-1036.

Wang; et al.; "Capacity-Delay Tradeoff for Information Dissemination Modalities in Wireless Networks;" in Information Theory; ISIT 2008; IEEE International Symposium; Jul. 2008; pp. 677-681.

Wang, et al.; "Embracing Interference in Ad Hoc Networks Using Joint Routing and Scheduling with Muitiple Packet Reception;" in INFOCOM 2008; The 27$^{th}$ Conference on Computer Communications; IEEE; Apr. 2008; pp. 1517-1525.

Zhao, et al.; "A MuItiqueue Service Room MAC Protecol for Wireless Networks With Multipacket Reception;" IEEE/ACM Transactions on Networking; vol. 11; No. 1; Feb. 2003.

Zhao, et al.; "On analyzing and improving COPE performance;" Information Theory and Applications Workshop (ITA), Jan. 2010; pp. 1-6.

Cloud, et al; U.S. Appl. No. 13/654,866, filed Oct. 18, 2012.

Response to Office Action dated Jan. 5, 2015 corresponding to U.S. Appl. No. 13/654,866; Response filed on Mar. 31, 2015; 21 Pages.

312 Amendment filed on Aug. 13, 2015 for U.S. Appl. No. 13/654,866; 10 Pages.

(56) References Cited

OTHER PUBLICATIONS

Office Action dated Jan. 20, 2016 corresponding to U.S. Appl. No. 14/826,256; 57 Pages.
Notice of Allowance dated May 22, 2015 corresponding to U.S. Appl. No. 13/654,866; 21 Pages.
U.S. Appl. No. 14/882,115, filed Aug. 10, 2015, Lima, et al.
U.S. Appl. No. 14/843,358, filed Sep. 2, 2015, Haupler, et al.

* cited by examiner

| Case | (a) Cross Topology | | (b) "X" Topology | | (c) Partial Cross Topology | | (d) Partial "X" Topology | |
|---|---|---|---|---|---|---|---|---|
| | Unicast | Broadcast | Unicast | Broadcast | Unicast | Broadcast | Unicast | Broadcast |
| Routing | 2.78 | 2.78 | 2.78 | 2.78 | 2.78 | 2.78 | 2.78 | 2.78 |
| Network Coding (NC) | 4.17 | 4.17 | 3.57 | 3.57 | 3.57 | 3.57 | 3.57 | 3.13 |
| MPR ($m=2$) | 3.57 | 3.57 | 3.57 | 3.57 | 3.57 | 3.57 | 3.57 | 3.57 |
| MPR ($m=4$) | 4.17 | 4.17 | 4.17 | 4.17 | 4.17 | 4.17 | 4.17 | 4.17 |
| NC and MPR ($m=2$) | 6.25 | 6.25 | 5 | 5 | 5 | 5 | 5 | 4.17 |
| NC and MPR ($m=4$) | 6.25 | 6.25 | 6.25 | 5 | 6.25 | 5 | 6.25 | 5 |

*FIG. 6*

JOINT USE OF MULTI-PACKET RECEPTION AND NETWORK CODING FOR PERFORMANCE IMPROVEMENT

CROSS REFERENCE TO RELATED APPLICATION

The present application claims the benefit of U.S. Provisional Patent Application No. 61/553,386 filed on Oct. 31, 2011, which is incorporated by reference herein in its entirety.

GOVERNMENT RIGHTS

This invention was made with Government support under Contract No. FA8721-05-C-0002 awarded by the U.S. Air Force. The Government has certain rights to the invention.

FIELD

This application relates generally to wireless communication and, more particularly, to techniques for enhancing throughput in a wireless network.

BACKGROUND

In a wireless system, bandwidth is typically a limited and expensive resource. Therefore, there is a general desire to develop communication strategies that use bandwidth efficiently. In a network scenario, this desire to use bandwidth efficiently may be realized by developing techniques for increasing throughput in the network.

SUMMARY

In accordance with one aspect of the concepts, systems, circuits, and techniques described herein, a method for use in a wireless mesh network that utilizes network coding and multi-packet reception (MPR) to distribute data in the network includes allocating transmission resources to nodes in the wireless network based, at least in part, on an amount of non-self-generated traffic to flow through the nodes of the network. In one embodiment, the method further includes limiting an amount of self-generated traffic that a relay node can transmit during its time slot allocation. The amount of self-generated traffic that the relay node can transmit may be limited, for example, to an average per node non-self-generated traffic level in the wireless mesh network. The amount of non-self-generated traffic to flow through the nodes of the network may be determined in one embodiment based on a current network topology and an amount of data stored in transmit buffers of nodes in the wireless mesh network. The allocation of transmission resources to nodes may be performed in a manner that provides fairness to information flows within the network.

In accordance with another aspect of the concepts, systems, circuits, and techniques described herein, a device for use in a wireless network that utilizes network coding and multi-packet reception (MPR) comprises: one or more wireless transceivers having MPR capability; a network coding module to perform network coding and/or network decoding for the device; and a resource allocation unit to allocate transmission resources to nodes of the wireless network based, at least in part, on an amount of non-self-generated traffic to flow through the nodes of the network. In one embodiment, the resource allocation unit may be configured to allocate transmission resources to nodes of the wireless network based, at least in part, on any one, or a combination of a current topology of the wireless network, a type of traffic to flow through the network, node types in the network, and an MPR capability of the receivers used in the network. The type of traffic may be determined in whole or in part by the number of destination nodes to receive the traffic. The type of traffic may also include information about priorities associated with the nodes of the network.

In accordance with still another aspect of the concepts, systems, circuits, and techniques described herein, a method for use in a wireless network that utilizes network coding and multi-packet reception (MPR) to distribute data in the network comprises allocating transmission resources to nodes of the wireless network based, at least in part, on a current topology of the wireless network. The allocation of transmission resources may be performed in a manner that provides fairness to information flows in the network, rather than fairness to individual nodes. In other embodiments, other fairness metrics may be used including for example, fairness to nodes, or priorities given to certain nodes. In addition, the allocation of transmission resources may be performed based, at least in part, on an amount of non-self-generated traffic to flow through the nodes of the network at network saturation. In some embodiments, an amount of self-generated traffic that a relay node can transmit within its allocated resources may be limited. For example, in one embodiment, the self-generated traffic is limited to an average per node non-self-generated traffic level in the wireless network.

In accordance with a further aspect of the concepts, systems, circuits, and techniques described herein, a device for use in a wireless network that utilizes network coding and multi-packet reception (MPR) comprises: a wireless transceiver having MPR capability, a network coding module to perform network coding and/or network decoding for the device; and a resource allocation unit to allocate transmission resources to nodes of the wireless network based, at least in part, on a current topology of the wireless mesh network. In one embodiment, the resource allocation unit is configured to allocate transmission resources to nodes of the wireless network based, at least in part, on the topology of the wireless network and the type of traffic to flow through the network. In another embodiment, the resource allocation unit is to allocate transmission resources to nodes of the wireless network based, at least in part, on the topology of the wireless network, the type of traffic to flow through the network, and an MPR capability of the receivers to be used in the network. In still another embodiment, the resource allocation unit is configured to allocate transmission resources to nodes of the wireless network based, at least in part, on the current topology of the wireless network, the type of traffic to flow through the network, and the node type of nodes in the network. In yet another embodiment, the resource allocation unit is to allocate transmission resources to nodes of the wireless network based, at least in part, on the current topology of the wireless network, the type of traffic to flow through the network, the node type of each node in the network, and an MPR capability of the receivers to be used in the network. In still another embodiment, the resource allocation unit is to allocate transmission resources to nodes of the wireless network in a manner that provides fairness to information flows in the network. In another embodiment, the resource allocation unit is configured to allocate transmission resources to nodes of the wireless network based, at least in part, on an amount of non-self-generated traffic to flow through the nodes of the network.

In accordance with a still further aspect of the concepts, systems, circuits, and techniques described herein, a wireless network comprises: (a) a plurality of nodes that each include: (i) one or more wireless transceivers having multi-packet reception (MPR) capability; and (ii) a network coding module to perform network coding and/or network decoding for the node; and (b) resource allocation logic to allocate transmission resources to nodes of the wireless network based, at least in part, on an amount of non-self-generated traffic to flow through the nodes of the wireless network. The resource allocation logic may be a centralized unit at a single location within the network or a system that is distributed throughout the network. In some implementations, the network may also have one or more nodes that do not have MPR capability.

BRIEF DESCRIPTION OF THE DRAWINGS

FIG. 6 is a table illustrating calculated maximum network throughput gains for the topologies described in FIGS. 2, 3, 4, and 5 for various combinations of network coding and multi-packet reception (MPR) using a novel medium access control (MAC) protocol in accordance with an implementation;

DETAILED DESCRIPTION

Figure 1:
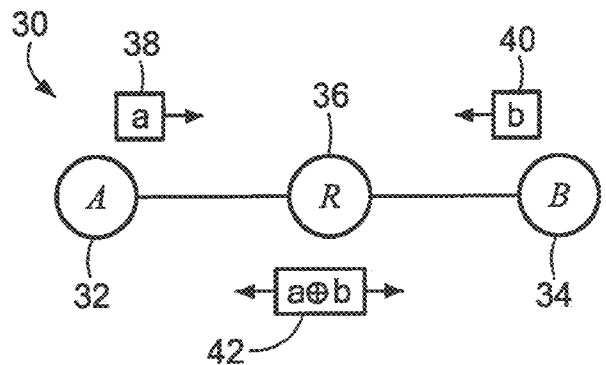
FIG. 1 is a schematic diagram illustrating a simple network and showing how network coding may be used to enhance network throughput.

A wireless mesh or ad-hoc network is a decentralized type of network that includes a number of wireless nodes that can intercommunicate through peer-to-peer wireless links. This is in contrast to an infrastructure-type wireless network where wireless nodes within a region communicate with one another, and/or with a larger network, through an associated wireless access point, base station, or other centralized control station. A wireless mesh network is a "fully connected" network if each of the nodes of the network can communicate with each of the other nodes through a direct wireless link. In a wireless mesh network that is not "fully connected," one or more of the nodes in the network may serve as a relay node to relay messages between other nodes. A wireless mesh network may include any number of nodes (i.e., N≥2, where N is the number of nodes in the network). In addition, each of the wireless nodes in a wireless mesh network may include one or more wireless transceivers to support wireless communication with one or more of the other nodes in the network.

The route that a packet takes between a source node and a destination node in a wireless mesh network is known as a "path" through the network. A "one hop" path is a direct link between a source node and a destination node. A "two hop" path involves one link from a source node to a relay node and another link from the relay node to the destination node. Multi-hop paths that use multiple relay nodes between a source node and a destination node (e.g., a three hop path, etc.) may also be used in some networks. It should be appreciated that wireless mesh networks and ad-hoc networks may, in some implementations, include one or more nodes that perform an infrastructure type function. For example, mesh networks may, in some cases, include one or more mesh routers or mesh gateways to provide communication between mesh nodes and other networks (e.g., other mesh networks, the Internet, a private enterprise network, the Internet, a public switched telephone network (PSTN), a local area network, a municipal area network (MAN), a wide area network, and/or others).

As used herein, a "unicast" transmission is a transmission of a packet or packets from a specific source node to a specific destination node. A "broadcast" transmission is a transmission of a packet or packets from a source node to all other nodes in a network or sub-network. A "multicast" transmission is a transmission of a packet or packets from a specific source node to multiple, but not necessarily all, other nodes in the network. A sequence of packets traveling between a source node and a destination node or nodes (whether unicast, multicast, or broadcast) may be referred to as a "packet flow" or simply as a "flow."

In a typical operational scenario within a mesh network, there may be a subset of nodes in the network that have packets ready for transmission (e.g., stored within a transmit buffer, etc.) at a particular point in time. For example, there may be J nodes in the network (J≤N) that each have k packets ready for transmission. The packets that are ready for transmission may include unicast traffic, multicast traffic, and/or broadcast traffic. The goal may be to successfully transfer all of these packets to their respective destinations. It is desirable that these transfers be made in a timely manner. One performance metric that is often discussed in connection with communication networks is "throughput," which may be defined as an average rate of successful message delivery. Throughput may be specified for a particular communication channel or link, for traffic flowing through a particular node, or for an entire network or system (in which case, it may alternatively be referred to as "system throughput" or "aggregate throughput"). Throughput may be specified using any of a number of different formats including, for example, bits per second, data packets per second, data packets per time slot, and/or other formats. It is generally desirable to improve the throughput level for a channel, node, network, or system to make better use of available resources.

One technique that may be used to improve throughout in a wireless mesh network is network coding. In a network that does not use network coding, a relay node will typically just re-transmit received packets in the same form that they were received to facilitate transfer of the packets to their intended destinations. When network coding is used, on the other hand, a relay node may linearly combine data from multiple received packets to form a new packet (i.e., a coded packet) and then transmit the new packet in the network to facilitate the transfer of the multiple received packets to their intended destinations within a single transmission. Nodes receiving the coded packet may then extract relevant data packets from the coded packet using one or more decoding techniques. It has been shown that the use of network coding can significantly increase throughput in a mesh network.

FIG. 1 is a schematic diagram of a simple mesh network 30 that shows how network coding may be used to enhance network throughput. FIG. 1 illustrates a form of network coding known as COPE. COPE, and some other forms of network coding, rely on the broadcast nature of a wireless channel to allow nodes to overbear transmissions of neighbor nodes for eventual use in extracting data from coded packets received in the network. As shown in FIG. 1, the network 30 includes a first node 32 (node A), a second node 34 (node B), and a third node 36 (node R). First node 32 has a first packet 38 (i.e., packet a) that it wants to transfer to second node 34. Likewise, second node 34 has a second packet 40 (i.e., packet b) that it wants to transfer to first node 32. First and second nodes 32, 34 do not have a direct wireless link between them, so third node 36 is used as a relay node.

During a first time slot, first node 32 may transmit first packet 38 to third node 36, which stores the packet in memory. During a next time slot, second node 34 may transmit second packet 40 to third node 36. Third node 36 may then linearly combine first packet 38 and second packet 40 using an exclusive-OR (XOR) operation to generate a third packet 42 (i.e., the coded packet). Third node 36 then transmits (e.g., broadcasts) third packet 42, which is subsequently received by first node 32 and second node 34. Because first node 32 has knowledge of first packet 38, it is able to extract second packet 40 from the coded packet 42 (i.e., first node 32 is able to decode the coded packet 42). Likewise, because second node 34 has knowledge of second packet 40, it is able to extract first packet 38 from the coded packet 42.

If network coding was not being used, third node 36 would have to forward first packet 38 and second packet 40 during separate time slots. Using COPE, however, first packet 38 and second packet 40 could both be forwarded during a single time slot, thereby increasing network throughput. It should be appreciated that COPE is a relatively simple form of network coding that uses the XOR function to linearly combine packets being forwarded in a network. Other more complex forms of network coding also exist (e.g., randomized linear network coding that provides a linear combination of packets using randomly selected coefficients, etc.). In some embodiments described herein, a generalization of COPE may be used in conjunction with MPR and tailored resource allocation.

Another technique that may be used to enhance throughput in a wireless network is multi-packet reception (MPR). In traditional mesh networks, wireless devices were typically limited to receipt of one packet from one source within a particular time slot. Signals transmitted from other sources during the time slot were considered undesired interference and would often cause a "collision" to occur in the channel that could compromise the receiver's ability to detect and decode the desired signal. MPR is a technique that allows a receiver to receive packets from multiple different sources simultaneously, thereby reducing the negative impact of collisions in the channel. Various different wireless transmission technologies may be utilized to support the implementation of MPR in a wireless network including, for example, code division multiple access (CDMA), frequency hopping spread spectrum, direct sequence spread spectrum, multiple input/multiple output (MIMO), orthogonal frequency division multiple access (OFDMA), and/or others. In one approach, which will be referred to herein as heterogeneous MPR, MPR may be implemented using multiple different radio technologies. This may include, for example, multiple radios operating in accordance with different wireless standards (e.g., two or more of IEEE 802.11, IEEE 802.15, IEEE 802.16, Bluetooth, Zigbee, Ultrawideband, third generation mobile communication standards, fourth generation mobile communication standards, satellite communications standards, wireless cellular standards, and/or others). MPR can improve throughput in a wireless network by, among other things, relieving channel contention and multi-user interference issues, reducing data loss due to collisions, and increasing the amount of data that can be transferred per unit of time. In many cases, MPR-enabled receivers are needed for MPR to be successfully implemented within a network. The number of packets that an MPR-enabled receiver is capable of receiving simultaneously will be referred to herein as the MPR coefficient (m) of the receiver.

As will be described in greater detail, in some implementations described herein, network coding and MPR are used together within a wireless network to provide an enhanced level of performance (e.g., increased system throughput, reduced delay, etc.) in the network. For example, referring back to the simple mesh network 30 of FIG. 1, MPR techniques may be used to improve throughput in this network. That is, MPR may be combined with COPE by allowing first and second nodes 32, 34 to transmit first and second packets 38, 40 at the same time (i.e., during the same time slot). Third node 36 may then transmit third (coded) packet 42 during a subsequent time slot. As will be appreciated, the data transfer operation of delivering first packet 38 to second node 34 and second packet 40 to first node 32 is performed in less time (i.e., greater throughput) using this approach than using COPE alone. As will be described in greater detail, this concept may be extended to other network topologies and scenarios.

In addition to the above, in some implementations, unique medium access control (MAC) techniques are provided that are capable of further enhancing network performance. In one approach, for example, a novel MAC protocol is provided that can further enhance throughput in a network that uses both network coding and MPR. The MAC protocol allocates transmission resources in a network in a manner that provides fairness to information flows, rather than fairness to individual nodes as specified in, for example, the IEEE 802.11 wireless networking standard. The current IEEE 802.11 MAC protocol allocates the same amount of network resources to bottlenecked nodes as to edge nodes, despite the former's need to use some of these resources for relaying. It has been found that the improved MAC techniques described herein, in combination with network coding, MPR, and fairness to flows are capable of increasing achievable throughput by as much as 6.3 times or more over networks that do not use network coding and MPR.

It has been found that the overall improvement in throughput that can be achieved in a wireless mesh network that is using both MPR and network coding depends upon a number of different factors. These different factors may include, for example, the particular network topology being used, the MPR capability of the network, the type of traffic being carried in the network, and/or other factors. In some implementations described herein, factors such as these are taken into consideration during an allocation of transmission resources (e.g., time slots, frequency channels, CDMA codes, polarizations, OFDMA subchannels, and/or others, including combinations of the above) to nodes within a mesh network.

In the discussion that follows, a particular network model will be assumed for purposes of analysis. In this model, packets are never delayed. That is, if a node in the network has only a single codable packet, it will not wait for another packet to arrive before transmitting a signal. Rather, the node will transmit the packet uncoded at the first opportunity. The model also assumes that all packets in the network are of the same length. Third, packets headed towards the same next hop will never be coded together under the model. This is because, if this were not required, the node associated with the next hop would not have enough information available to decode the coded packet (i.e., the node would not have the necessary degrees of freedom to decode), since fewer coded packets are transmitted than original packets.

In the model, it will be assumed that each node can randomly generate packets and each packet may then be transmitted through a relay node to a destination. The relay node will be assumed to be fully connected regardless of the network topology and packets generated at the relay node will require only a single hop to reach their intended destination. A unicast transmission will be considered complete when all packets from each source node successfully reach their destinations. A broadcast transmission will be considered complete when all nodes within the network have received each packet from all of the sources. Furthermore, under the model, it will be assumed that each node is half-duplex and, as a result, a node cannot receive another node's transmissions while it is transmitting.

Under the model, it will also be assumed that each node can receive multiple simultaneous packets without delay or loss. In addition, if a node is not transmitting and it has direct communication or can overhear another node, it will automatically receive any transmission made by that node and will be able to use that information to decode any coded messages it receives.

FIGS. 3, 4, 5, and 6, are schematic diagrams illustrating various network topologies that may exist within wireless mesh networks. As will be described in greater detail, it has been found that optimal techniques for implementing MPR and network coding within a wireless mesh network may depend upon a current network topology of the network. The network topologies of FIGS. 3, 4, 5, and 6 are topologies that naturally form bottlenecks and create congestion. In the discussion that follows, each of the network topologies of FIGS. 3, 4, 5, and 6 will be briefly described. Enhanced techniques for managing network traffic in networks using these and other topologies will then be discussed.

Figure 2:
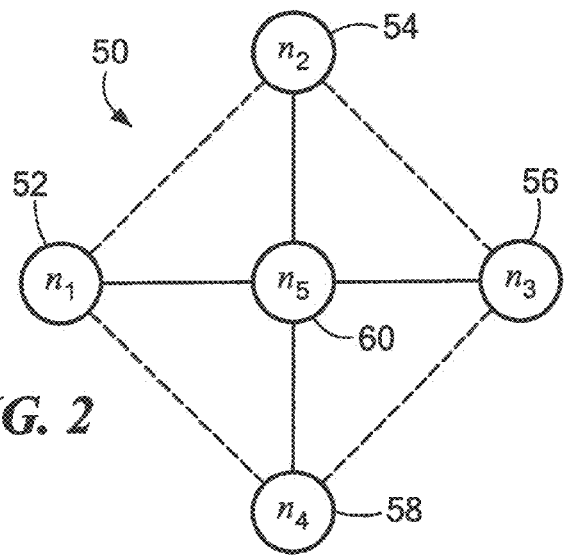
FIGS. 2, 3, 4, and 5 are schematic diagrams illustrating various network topologies that may exist within wireless networks.
Figure 3:
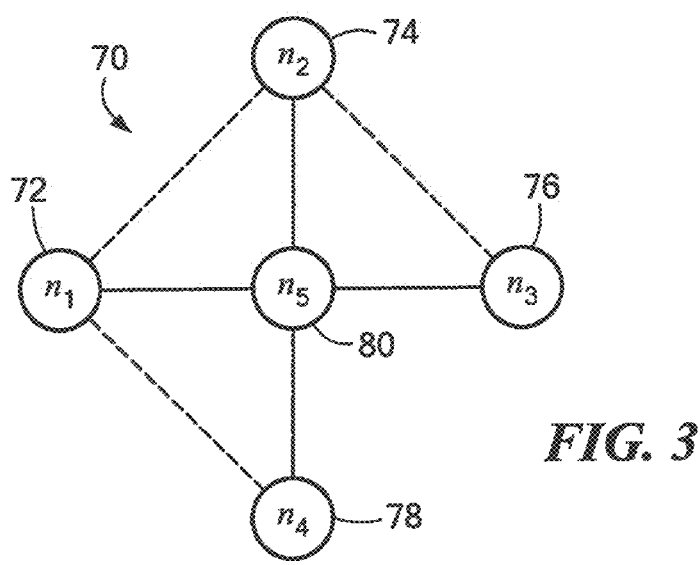

FIG. 2 is a diagram illustrating a cross topology 50 having fives nodes 52, 54, 56, 58, 60. The first four nodes 52, 54, 56, 58 are edge nodes and the fifth node 60 is a central relay node. Each of the nodes 52, 54, 56, 58, 60 of the cross topology 50 can directly transmit and receive information to/from every other node. The only exception is that each edge node is not connected with an edge node on an opposite side of relay node 60 (e.g., node 52 is not directly connected to node 56, and node 54 is not directly connected to node 58). FIG. 3 is a diagram illustrating a modified cross topology 70 having fives nodes 72, 74, 76, 78, 80. The modified cross topology 70 is similar to the cross topology 50 of FIG. 2, except edge node 76 and edge node 78 are not directly connected and therefore cannot overhear each other's transmissions.

Figure 4:
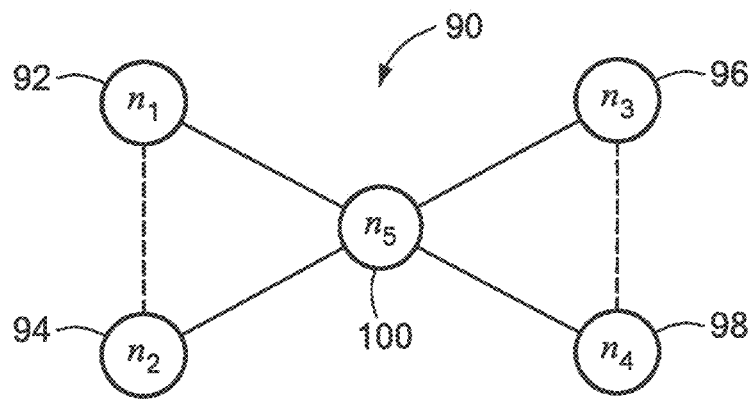
Figure 5:
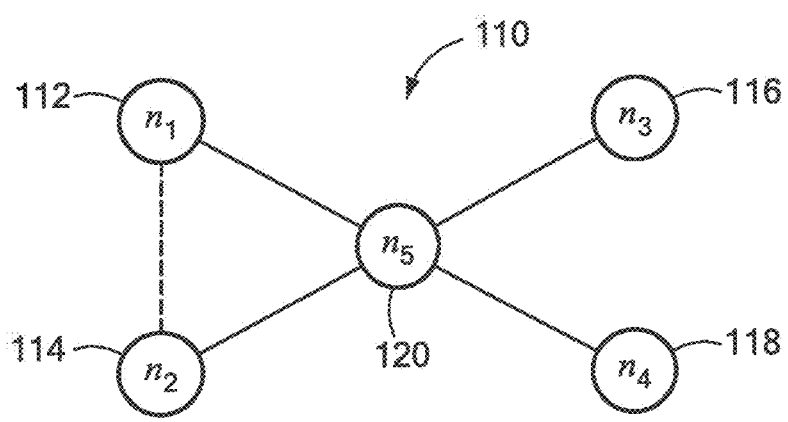

FIG. 4 is a diagram illustrating an X topology 90 having five nodes 92, 94, 96, 98, 100. The first four nodes 92, 94, 96, 98 are edge nodes and the fifth node 100 is a central relay node. In the X topology 90, it is assumed that nodes 92, 94, 100 are directly connected to one another and nodes 96, 98, and 100 are directly connected to one another, but there is no direct connection between nodes 92, 94 in a first edge node group $X_1$ and nodes 96, 98 in a second edge node group $X_2$. That is, all traffic between a node in group $X_1$ and a node in group $X_2$ must take place through relay node 100. FIG. 5 is a diagram illustrating a modified X topology 90 having fives nodes 112, 114, 116, 118, and 120. Modified X-topology 110 is similar to the X topology 90 of FIG. 4, except that there is no direct connection between nodes 116 and 118.

In analyzing the various network topologies set out above, it will be assumed that each edge node transmits all of its available packets to the corresponding relay node. Once every node has sent all of its available packets to the relay node, the relay node will either identify coding opportunities and transmit a set of coded messages optimized for the network topology being used or send the packets uncoded. When MPR is being used, m packets will be allowed to be sent from different sources in a single time slot. Since MPR, in the context of the topologies analyzed, is a method of avoiding collisions due to hidden nodes, the existing carrier sense multiple access with collision avoidance (CSMA/CA) protocols of the IEEE 802.11 standard will be followed for each m=2 case. For cases involving m=4, an extended version of CSMA/CA will be used to allow each edge node to transmit in the same time slot to the relay node. In the analysis, the effects of collisions due to either hidden nodes or identical back off times will not be considered because the effects on total throughput are small in relation to the effects of fairness provided by the 802.11 MAC. In addition, the potential gains resulting from MPR alleviating impacts of the exposed terminal problem caused by IEEE 802.11 virtual CS mechanisms will not be considered.

As described above, it has been found that, when implementing network coding with MPR, the medium access control (MAC) protocol can impact overall performance in a significant manner. For networks with bottlenecks, such as networks using the network topologies of FIGS. 3, 4, 5, and 6, the parameters used to ensure fairness among competing nodes at saturation are critical to ensuring that enhanced throughput is achieved. In the current IEEE 802.11 MAC, time slots are distributed equally among all competing nodes within a network, regardless of topology. As network load increases, therefore, this MAC will limit each edge node's traffic to the relay node, while the rate of traffic introduced to the network by the relay node will not be similarly constrained. In each of the different topologies, therefore, nodes sending both relayed traffic and self-generated traffic will inherently send more of their own self-generated traffic and the effectiveness of opportunistic network coding will be reduced. In at least one aspect of the techniques and concepts described herein, a novel MAC protocol is provided that allocates time slots (or other transmission resources) to competing nodes using a basic knowledge of the current network topology and the MPR capabilities of each receiver. In this manner, the MAC is able to provide fairness to information flows, rather than individual nodes.

In one approach, the novel MAC allocates transmission resources to nodes in a manner that is based, at least in part, on an amount of non-self-generated traffic to flow through each node. The amount of non-self-generated traffic to flow through a node may be based upon, for example, an amount of data stored in transmit buffers of the nodes of the network and the network topology. Using this approach, a relay node will typically be allocated more resources than an edge node because it must also relay information. In addition, in some implementations, the MAC may require each node relaying information to limit an amount of self-generated traffic to the average per node non-self-generated traffic being relayed. While allocating fewer resources to flows originating at the relay node and more resources to flows originating at the edge nodes yields even higher throughputs, the MAC ensures that each flow of information is given the same priority. In the discussion that follows, techniques are described for allocating resources (e.g., time slots and/or other transmission resources) to the nodes of networks based, at least in part, on network topology and MPR coefficient in accordance with an implementation. The discussion will be made with reference to the network topology diagrams of FIGS. 3, 4, 5, and 6.

For the cross topology 50 of FIG. 2, the allocation of resources is the same for both unicast and broadcast transmission. This is assuming that that there is no constraint on the order in which each node transmits. When network coding is not used, relay node 60 requires a number of time slots equal to the sum of source nodes, N. When network coding is used, throughput can be maximized by ensuring that relay node 60 codes a maximum number of uncoded packets together. Using MPR in this scenario can potentially prevent each node from immediately decoding any coded message sent by relay node 60 since we are allowing nodes with indirect lines of communication to transmit at the same time. For example, when m=2, relay node 60 needs to send two coded packets, each combined in a different manner, to ensure that each edge node has the necessary degrees of freedom to decode the packet. Generalizing for N and m gives the following:

$$s_i = \begin{cases} \dfrac{1}{\lceil (N-1)/m \rceil + N} & \text{without } NC \\ \dfrac{1}{\lceil (N-1)/m \rceil + m_c + 1} & \text{with } NC \end{cases}$$

$$s_R = \begin{cases} \dfrac{N}{\lceil (N-1)/m \rceil + N} & \text{without } NC \\ \dfrac{m_c + 1}{\lceil (N-1)/m \rceil + m_c + 1} & \text{with } NC \end{cases}$$

where $s_i$ is the fraction of time slots allocated to each edge node 52, 54, 56, 58 and $s_R$ is the fraction of time slots allocated to relay node 60. The variable $m_c$ depends upon whether or not carrier sense multiple access (CSMA) is being used and may be defined as follows:

$$m_c = \begin{cases} m & m = 1 \text{ or } 2 & CSMA \text{ is not used} \\ m-1 & m = 2 & CSMA \text{ is used} \\ m-1 & m = 4 & \end{cases}$$

It should be appreciated that, when CSMA is used, only nodes on opposite sides of relay node 60 are allowed to transmit in the same time slot. Enforcement of this limitation can result in a significant gain in throughput for small N, but the effect may become less significant as N grows.

For unicast traffic in the X topology 90 of FIG. 4, the maximum number of packets that can be coded together is two and only packets from different sets can be usefully coded together. As a result, the fraction $s_i^U$ of time slots allocated for unicast traffic is:

$$s_i^U = \begin{cases} \dfrac{1}{\lceil (N-1)/m \rceil + N} & \text{without } NC \\ \dfrac{1}{\lceil (N-1)/m \rceil + \max(|X_1|, |X_2|) + 1} & \text{with } NC \end{cases}$$

$$s_R^U = \begin{cases} \dfrac{N}{\lceil (N-1)/m \rceil + N} & \text{without } NC \\ \dfrac{\max(|X_1|, |X_2|) + 1}{\lceil (N-1)/m \rceil + \max(|X_1|, |X_2|) + 1} & \text{with } NC \end{cases}$$

where $|X_1|$ is a number of nodes in a first edge node group and $|X_2|$ is a number of nodes in a second edge node group. When the number of nodes, packets, and/or destinations on either side of relay node 100 is asymmetric, the number of packets that will be coded together is equal to the minimum of the number of packets originating from set $X_1$ or $X_2$. The remaining packets will be forwarded uncoded.

For broadcast traffic in the X topology 90 of FIG. 4, the equations set out above for unicast traffic in the X topology still apply when network coding is not used. When network coding is allowed, there is a possibility that each destination node will require a maximum of one additional degree of freedom per node for m=2 or three additional degrees of freedom per node for m=4 when either $|X_1| \geq m$ or $|X_2| \geq m$ and the order of node transmission is not enforced. Providing these additional degrees of freedom can be accomplished by relay node 100 sending at most three coded packets, where the sum of all of the native edge node packets are included in each coded transmission and each coded packet is combined in a different manner. Each edge node's fraction of time slots is maximized when the cardinality of each set of nodes, $X_1$ and $X_2$, is equal. The fraction of time slots is minimized when the cardinality of each set is asymmetric; and for m>1, transmission from edge nodes 92, 94, 96, 98 to relay node 100 is asymmetric (i.e., multiple nodes from a single set transmit at the same time). The fraction $s_i^B$ of time slots for each edge node when network coding is used in the X topology for broadcast traffic may be expressed as follows:

$$\dfrac{1}{\lceil (N-1)/m \rceil + \max(|X_1|, |X_2|) + m} \leq s_i^B \leq s_i^U$$

where $s_i^U$ is the fraction of time slots of an edge node for unicast traffic. Similarly, the fraction of time slots for the relay node when network coding is used for broadcast traffic may be expressed as follows:

$$s_R^U \leq s_R^B \leq \dfrac{\max(|X_1|, |X_2|) + m}{\lceil (N-1)/m \rceil + \max(|X_1|, |X_2|) + m}$$

where $s_R^U$ is the fraction of time slots of a relay node for unicast traffic.

For the partial cross topology 70 of FIG. 3 and the partial X topology 110 of FIG. 5, the fraction of time slots used by each node of the network will be similar to those described above for the full cross topology 50 of FIG. 2 and the full X topology 90 of FIG. 4. As discussed above, the use of the described resource allocation scheme has been shown to result in significant increases in network throughput performance (at saturation) in networks implementing both network coding and MPR, as well as in networks that can use only network coding or only MPR. The scheme can also provide throughput gains in networks that use routing. FIG. 6 is a diagram illustrating a table 130 showing maximum network throughput gains for the various topologies described above for various combinations of network coding and MPR using the new MAC described above. As shown, when using both network coding and MPR, gains in maximum throughput of up to 6.25 may be achieved over implementations using the current IEEE 802.11 MAC protocol. These techniques can be extended for use in larger networks and, it is expected, may provide even further gains in throughput as network size increases.

Figures 7, 8:
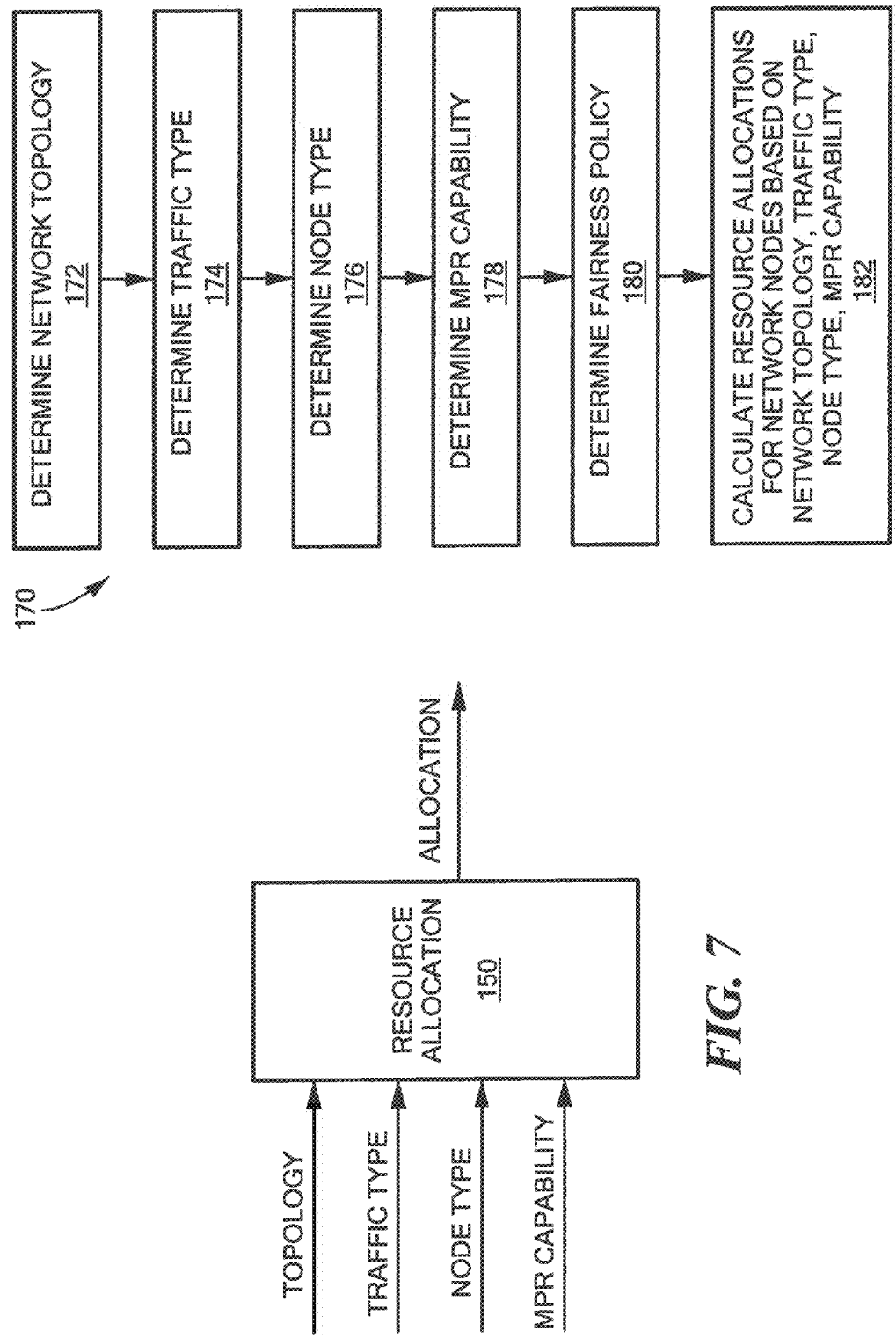
FIG. 7 is a block diagram illustrating a resource allocation unit that may be used to provide resource allocation services from a single location in a network in accordance with an implementation.
FIG. 8 is a flowchart illustrating a method for allocating resources within a wireless network in accordance with an implementation.

FIG. 7 is a block diagram illustrating a resource allocation unit 150 that may be located within a node device or other device to provide resource allocation services for mesh networks that use both network coding and MPR in accordance with an implementation. Resource allocation unit 150 may be used to allocate resources within an ad-hoc or mesh wireless network in accordance with principles discussed herein. Resource allocation unit 150 may be part of, for example, a medium access control layer of a wireless node device. As illustrated, resource allocation unit 150 may receive inputs for various parameters of a wireless network (or actively solicit, poll, discover, or retrieve parameter information) and use these parameter values to determine how to allocate resources to one or more nodes of the network. As shown, in one embodiment, the parameter values may include, for example, network topology, traffic type, node type, and MPR capability. Other parameters values or combinations of parameter values may be used in other implementations.

The traffic type may include, for example, whether the traffic is unicast, multicast, or broadcast traffic. In some embodiments, the traffic type may also include a "priority" of the traffic. That is, in some implementations, different source nodes (or users associated with those nodes) may have different priorities based on, for example, the importance of the node/user/message, delay constraints associated with the node/user/message, quality-of-service (QoS) associated with the node/user/message, and/or other factors. This information may be taken into consideration when making the resource allocation decision. The "node type" may include, for example, whether a node is an edge node or a relay node.

The MPR capability that is used to perform resource allocation will typically depend on the MPR capabilities of the nodes in a network. In different implementations, the nodes in the network may all have the same MPR capability or different nodes may have different MPR capability. If all nodes have the same MPR capability, then that MPR capability of the nodes may be used to perform resource allocation. If different nodes have different capabilities (e.g., some have a higher MPR coefficient and some have a lower MPR coefficient), then the MPR capability used to perform resource allocation may be determined in a number of different ways. In one approach, the lower MPR coefficient among the nodes may be selected. In another approach, the higher MPR coefficient among the nodes may be selected. In still another approach, the higher MPR coefficient may be used by the transmitting nodes and the lower MPR coefficient may be used to perform backfilling and to transmit to the nodes having a lower MPR coefficient. In yet another approach, the transmitting nodes may use the lower MPR coefficient and backfilling operations may use the higher MPR coefficient.

In at least one implementation, resource allocation unit 150 may determine network allocations in a manner that provides fairness to data flows, rather than fairness to individual nodes. For example, resource allocation unit 150 may allocate resources to nodes in a manner that is proportional to an amount of non-self-generated traffic flowing through each node when the network saturates. Resource allocation unit 150 may also require each node relaying information to limit an amount of self-generated traffic to an average per node non-self-generated traffic being relayed. In some implementations, resource allocation unit 150 may use one or more of the equations set out herein (and/or other equations) to determine a resource allocation(s). In some other implementations, resource allocation unit 150 may determine resource allocations based on one or more additional or alternative metrics such as, for example, priorities associated with nodes/users/messages, message delay constraints, and/or others. An MPR coefficient of a wireless device will typically be a fixed value that is based on the capabilities of the device. Network topology and node type information may be available from, for example, topology discovery and/or route discovery protocols that are already active in a network.

In one possible implementation, when a mesh network is originally formed, one of the nodes of the network may be chosen to perform a resource allocation function for the network. The selected node may then activate a corresponding resource allocation unit 150 and begin to collect information necessary for determining resource allocations for the network. In some other implementations, a distributed approach may be used where each node may determine its own resource allocation using a corresponding resource allocation unit 150, although some coordination between nodes may be needed to provide a workable allocation for the overall network using this approach. In at least one implementation, resource allocation unit 150 may be implemented within a MAC module associated with a wireless transceiver or a host processor.

FIG. 8 is a flow diagram showing a process for allocating resources within a wireless mesh network that uses both network coding and MPR.

The rectangular elements (typified by element 172 in FIG. 8) are herein denoted "processing blocks" and may represent computer software instructions or groups of instructions. It should be noted that the flow diagram of FIG. 8 represents one exemplary embodiment of the design described herein and variations in such a diagram, which generally follow the process outlined, are considered to be within the scope of the concepts, systems and techniques described and claimed herein.

Alternatively, the processing blocks may represent operations performed by functionally equivalent circuits such as a digital signal processor circuit, an application specific integrated circuit (ASIC), or a field programmable gate array (FPGA). Some processing blocks may be manually performed while other processing blocks may be performed by a processor. The flow diagram does not depict the syntax of any particular programming language. Rather, the flow diagram illustrates the functional information one of ordinary skill in the art requires to fabricate circuits and/or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIG. 8 can be performed in any convenient or desirable order.

Turning now to FIG. 8, a method 170 for allocating resources within a wireless mesh network that uses both network coding and MPR will be described. A network topology of the network may first be determined (block 172). The network topology may be one of the topologies described previously, or a different topology. A traffic type to be transmitted by one or more nodes (e.g., broadcast, unicast, etc.) may then be determined (block 174). The node type of each node of the network may next be determined (block 176). This node type may include, for example, whether a node is an edge node or a relay node. An MPR capability to be used in the network may also be determined (block 178). The MPR capability for the network may be determined based on the capabilities of the nodes of the network. A fairness policy of the network may also be determined (block 180). Once this information has been collected, resource allocations may be computed for the network using the network topology, the traffic type, the node type, the MPT capability, and/or the fairness policy information (block 182). As described previously, in some implementations, resources may be allocated to nodes of the network in a manner that provides fairness to flows rather than fairness to individual nodes. In one possible approach, for example, resources may be allocated proportional to an amount of non-self-generated traffic flowing through each node when the network saturates. Resources may also be allocated so that an amount of self-generated traffic being transmitted by each relay node is limited to an average per node non-self-generated traffic being relayed.

The method 170 may be performed within, for example, one of the nodes of a mesh network and the resulting time allocations may then be communicated to the other nodes. In another possible approach, the method 170 may be performed within each of the nodes of the network, with some possible inter-node coordination, to determine a time slot allocation for the node. In some implementations, the method 170 may be repeated continually in the network so that an optimal or near optimal resource allocation is maintained.

Figure 9:
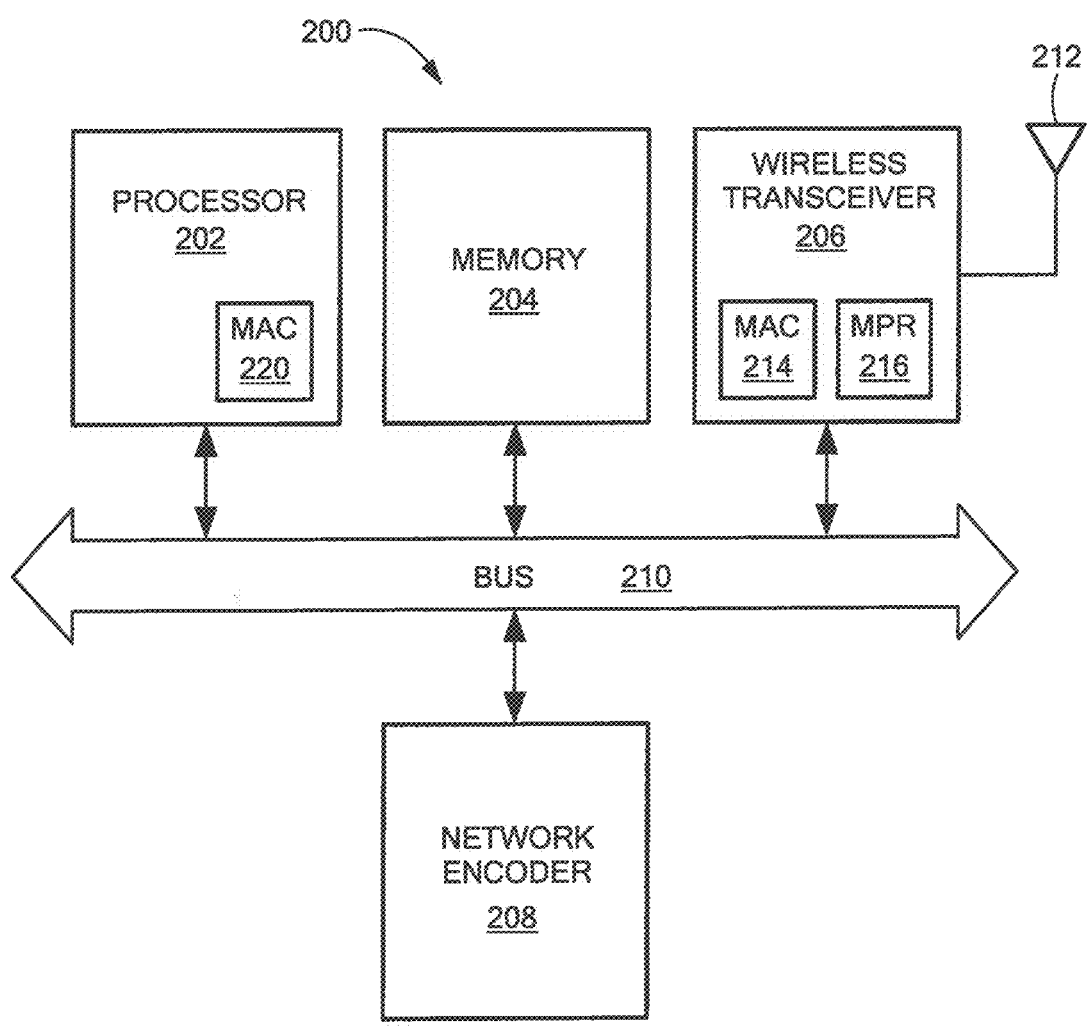
FIG. 9 is a block diagram illustrating an example wireless device architecture that may be used by a node in a wireless network in accordance with an embodiment.

FIG. 9 is a block diagram illustrating an example wireless device architecture 200 that may be used for a node in a wireless mesh network in accordance with an embodiment. As illustrated, the wireless device architecture 200 may include: one or more digital processors 202, a memory 204, a wireless transceiver 206, and a network coding module 208. A bus 210 and/or one or more other transmission structures may be provided for establishing interconnections between various components of the architecture 200. The wireless transceiver 206 may be coupled to one or more antennas 212 and/or other transducers to facilitate the transmission and/or reception of wireless signals.

Digital processor(s) 202 may include one or more digital processing devices that are capable of executing programs to provide one or more functions and/or services to a user. Digital processor(s) 202 may be used to, for example, execute an operating system of a corresponding wireless device. Digital processor(s) 202 may also be used to, for example, execute user application programs. In addition, digital processor(s) 202 may be used to implement, either partially or fully, one or more of the processes or techniques described herein in some implementations. Digital processor(s) 202 may include any type of digital processing device including, for example, a general purpose microprocessor, a digital signal processor (DSP), a controller, a microcontroller, an application specific integrated circuits (ASIC), a field programmable gate array (FPGA), a programmable logic array (PLA), a programmable logic device (PLD), a reduced instruction set computer (RISC), and/or others, including combinations of the above.

Wireless transceiver 206 may include any type of transceiver that is capable of supporting wireless communication with one or more remote wireless entities. In various implementations, wireless transceiver 206 may be configured in accordance with one or more wireless networking standards and/or wireless cellular standards. In some implementations, multiple wireless transceivers may be provided to support operation with different networks or systems in a surrounding environment. As illustrated in FIG. 9, in some implementations, wireless transceiver 206 may include a medium access control (MAC) module 214 to facilitate medium access operations on an associated wireless network medium or channel. In some embodiments, some of the MAC functionality may also be provided in digital processor(s) 32 (e.g., MAC module 220). In addition, in some implementations, wireless transceiver 36 may include a multi-packet reception (MPR) module 46 to facilitate the use of MPR by a corresponding wireless device.

Memory 204 may include any type of structure that is capable of storing digital information. The digital information may include, for example, digital user data, computer executable instructions and/or programs, or any other type of data. Memory 204 may include, for example, magnetic data storage devices, disc based storage devices, optical storage devices, semiconductor memories, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or others.

Network coding module 208 is operative for performing network coding operations and/or network decoding operations for the mobile device. In some implementations, network coding module 208 may be called upon to, for example, generate coded packets for re-transmission by combining packets received from other mobile devices. In some implementations, network coding module 208 may combine packets using an exclusive-OR function, such as used in COPE. However, in other implementations, other or additional forms of network coding may be implemented within network coding module 208 such as, for example, random linear network coding (RLNC). Although illustrated as a separate unit in FIG. 9, it should be appreciated that, in some implementations, the network coding module may be implemented within digital processor(s) 202.

It should be appreciated that the mobile device architecture 200 of FIG. 9 represents one possible example of an architecture that may be used in a implementation. Other architectures may alternatively be used. It should also be appreciated that all or part of the various devices, processes, or methods described herein may be implemented using any combination of hardware, firmware, and/or software.

Although discussed above primarily in the context of wireless mesh networks, it should be appreciated that the techniques, devices, and systems described herein can be used in other types of wireless network.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A method for use within a first node of a wireless network, the method comprising:
concurrently receiving, in a multi-packet reception (MPR) wireless transceiver of the first node, a plurality of non-self-generated packets from at least second and third nodes of the wireless network;
allocating transmission resources to nodes in the wireless network based, at least in part, on an amount of non-self-generated traffic to flow through the first node;
generating a plurality of encoded packets from the non-self-generated packets using network coding;
concurrently transmitting the plurality of encoded packets from the first node to at least the second and third nodes within transmission resources allocated to the first node; and
limiting an amount of self-generated traffic that the first node transmits to an average per node non-self-generated traffic level in the wireless network.

2. The method of claim 1, further comprising:
determining, before allocating transmission resources, the amount of non-self-generated traffic to flow through the first node based on a current network topology and an amount of data stored in transmit buffers of nodes in the wireless network.

3. The method of claim 1, wherein:
allocating the transmission resources includes allocating the transmission resources in a manner that provides fairness to information flows within the wireless network.

4. The method of claim 1, wherein:
the wireless network includes a wireless mesh network.

5. The method of claim 1, wherein the transmission resources include one or more of: time slots, frequency channels, spread spectrum codes, polarizations, and orthogonal frequency division multiple access (OFDMA) sub-channels.

6. A device for use in a first node of a wireless network, the device comprising:
one or more wireless transceivers having multi packet reception (MPR) capability to concurrently receive a plurality of non-self-generated packets from at least second and third nodes of the wireless network;
a network coding module to generate a plurality of encoded packets from the non-self-generated packets using network coding; and
a resource allocation unit to allocate transmission resources to nodes of the wireless network based, at least in part, on an amount of non-self-generated traffic to flow through the first node,
wherein the device is configured to concurrently transmit, using the one or more wireless transceivers, the plurality of encoded packets to at least the second and third nodes within transmission resources allocated to the first node, and to limit the amount of self-generated traffic that the first node transmits within its allocated transmission resources to an average per node non-self-generated traffic level in the wireless network.

7. The device of claim 6, wherein:
the resource allocation unit is to allocate the transmission resources based, at least in part, on a topology of the wireless network.

8. The device of claim 6, wherein:
the resource allocation unit is to allocate the transmission resources based, at least in part, on the topology of the wireless network and a type of traffic to flow through the wireless network.

9. The device of claim 8, wherein:
the type of traffic to flow through the wireless network includes priorities associated with the traffic.

10. The device of claim 6, wherein:
the resource allocation unit is to allocate the transmission resources based, at least in part, on the topology of the wireless network, the type of traffic to flow through the wireless network, and an MPR capability of the wireless network.

11. The device of claim 6, wherein:
the resource allocation unit is configured to allocate the transmission resources based, at least in part, on the current topology of the wireless network, the type of traffic to flow through the wireless network, and the node type of nodes in the wireless network.

12. The device of claim 6, wherein:
the wireless network includes a wireless mesh network.

13. A method for use in a first node of a wireless network, the method comprising:
concurrently receiving, in a multi-packet reception (MPR) wireless transceiver of the first node, a plurality of non-self-generated packets from at least second and third nodes of the wireless network;
allocating transmission resources to nodes of the wireless network based, at least in part, on a current topology of the wireless network;
generating a plurality of encoded packets from the non-self-generated packets using network coding;
concurrently transmitting the plurality of encoded packets from the first node to at least the second and third nodes within transmission resources allocated to the first node; and
limiting the amount of self-generated traffic that the first node transmits within its allocated transmission resources to an average per node non-self-generated traffic level in the wireless network.

14. The method of claim 13, wherein:
allocating the transmission resources includes allocating the transmission resources based, at least in part, on the current topology of the wireless network and the type of traffic to flow through the wireless network.

15. The method of claim 14, wherein:
the type of traffic to flow though the wireless network includes priorities associated with the traffic.

16. The method of claim 13, wherein:
allocating the transmission resources includes allocating the transmission resources based, at least in part, on the current topology of the wireless network, the type of traffic to flow through the wireless network, and an MPR capability of the wireless network.

17. The method of claim 13, wherein:
allocating the transmission resources includes allocating the transmission resources based, at least in part, on the current topology of the wireless network, the type of traffic to flow through the wireless network, and the node type of nodes in the wireless network.

18. The method of claim 13, wherein:
allocating the transmission resources includes allocating the transmission resources based, at least in part, on the current topology of the wireless network, the type of traffic to flow through the wireless network, the node type of nodes in the wireless network, and an MPR capability of the wireless network.

19. The method of claim 13, wherein:
allocating the transmission resources includes allocating the transmission resources in a manner that provides fairness to information flows in the wireless network.

20. The method of claim 13, wherein:
allocating the transmission resources includes allocating the transmission resources in a manner that accounts for message priorities in the wireless network.

21. The method of claim 13, wherein:
allocating the transmission resources includes allocating the transmission resources based, at least in part, on an amount of non-self-generated traffic to flow through the nodes of the wireless network.

22. The method of claim 13, wherein:
allocating the transmission resources includes allocating one or more of: time slots, frequency channels, spread spectrum codes, polarizations, and orthogonal frequency division multiple access (OFDMA) sub-channels.

23. The method of claim 13, wherein:
the wireless network includes a wireless mesh network.

24. A device for use in a first node of a wireless network, the device comprising:
a wireless transceiver having multi-packet reception (MPR) capability to receive a plurality of non-self-generated packets from at least second and third nodes of the wireless network;
a network coding module to generate a plurality of encoded packets from the non-self-generated packets using network coding; and
a resource allocation unit to allocate transmission resources to nodes of the wireless network based, at least in part, on a current topology of the wireless network,
wherein the device is configured to concurrently transmit, using the one or more wireless transceivers, the plurality of encoded packets to at least the second and third nodes within transmission resources allocated to the first node, and to limit the amount of self-generated traffic that the first node transmits within its allocated transmission resources to an average per node non-self-generated traffic level in the wireless network.

25. The device of claim 24, wherein:
the resource allocation unit is to allocate the transmission based, at least in part, on the topology of the wireless network and the type of traffic to flow through the wireless network.

26. The device of claim 24, wherein:
the resource allocation unit is to allocate the transmission resources based, at least in part, on the topology of the wireless network, the type of traffic to flow through the wireless network, and an MPR capability of the wireless network.

27. The device of claim 24, wherein:
the resource allocation unit is to allocate the transmission resources based, at least in part, on the current topology of the wireless network, the type of traffic to flow through the wireless network, and the node type of nodes in the wireless network.

28. The device of claim 24, wherein:
the resource allocation unit is to allocate the transmission resources based, at least in part, on the topology of the wireless network, the type of traffic to flow through the wireless network, the node type of nodes in the wireless network, and an MPR capability of the wireless network.

29. The device of claim 24, wherein:
the resource allocation unit is to allocate the transmission resources in a manner that provides fairness to information flows in the wireless network.

30. The device of claim 24, wherein:
the resource allocation unit is to allocate the transmission resources based, at least in part, on an amount of non-self-generated traffic to flow through the nodes of the wireless network.

31. The device of claim 24, wherein:
the device is part of one of the following: a network router, a portable computer, a smart phone, a satellite communicator, a satellite-based transceiver, a network storage device, a tablet, a mobile wireless apparatus, or a stationary wireless apparatus.

32. A wireless network comprising:
a plurality of nodes that each include:
one or more wireless transceivers having multi-packet reception (MPR) capability to concurrently receive a plurality of non-self-generated packets from at least two different nodes of the wireless network; and
a network coding module to generate a plurality of encoded packets from the non-self-generated packets using network coding; and
resource allocation module to allocate transmission resources to nodes of the wireless network based, at least in part, on an amount of non-self-generated traffic to flow through the node,
wherein each of the plurality of nodes is configured to concurrently transmit, using the one or more wireless transceivers, the plurality of encoded packets to at least the two different nodes and to limit the amount of self-generated traffic transmitted within its allocated transmission resources to an average per node non-self-generated traffic level in the wireless network.

33. The wireless network of claim 32, further comprising:
at least one additional node that does not have MPR capability.

34. The wireless network of claim 32, wherein:
the wireless network includes a wireless mesh network.

35. The wireless network of claim 32, wherein:
the resource allocation module is distributed across multiple locations in the wireless network.

36. The wireless network of claim 32, wherein:
the resource allocation module includes a centralized resource allocation unit located at a single location within the wireless network.

\* \* \* \* \*

UNITED STATES PATENT AND TRADEMARK OFFICE
CERTIFICATE OF CORRECTION

PATENT NO. : 9,544,126 B2
APPLICATION NO. : 13/654953
DATED : January 10, 2017
INVENTOR(S) : Linda M. Zeger et al.

It is certified that error appears in the above-identified patent and that said Letters Patent is hereby corrected as shown below:

In the Specification

Column 4, Line 11-12, delete "The Internet, a private enterprise network, the Internet, a public" and replace with --The Internet, a private enterprise network, a public--

Column 7, Line 43, delete "fives nodes" and replace with --five nodes--

Column 7, Line 52, delete "fives nodes" and replace with --five nodes--

Column 7, Line 58, delete "five nodes" and replace with --fives nodes--

Column 7, Line 67, delete "fives nodes" and replace with --five nodes--

Column 9, Line 58, delete "two and only packets from different sets" and replace with --two, and only packets from different sets--

Column 14, Line 67, delete "that that" and replace with --that the--

Signed and Sealed this
Ninth Day of July, 2019

Andrei Iancu
*Director of the United States Patent and Trademark Office*